United States Patent [19]
Kaneko et al.

[11] Patent Number: 5,442,501
[45] Date of Patent: Aug. 15, 1995

[54] DEVICE FOR HOLDING A CASSETTE HAVING A SLIDER AND A CASSETTE HAVING NO SLIDER

[75] Inventors: Koji Kaneko, Higashihiroshima; Takeshi Kubota, Hiroshima; Tatsunori Yamamoto, Higashihiroshima, all of Japan

[73] Assignee: Sharp Kabushiki Kaisha, Osaka, Japan

[21] Appl. No.: 321,595

[22] Filed: Oct. 12, 1994

Related U.S. Application Data

[63] Continuation of Ser. No. 986,517, Dec. 7, 1992, abandoned.

[30] Foreign Application Priority Data

Dec. 13, 1991 [JP] Japan .................................. 3-330531

[51] Int. Cl.6 .............................................. G11B 5/008
[52] U.S. Cl. ...................................... 360/94; 360/96.5
[58] Field of Search ................... 360/94, 133, 99.06, 360/99.07, 96.5, 96.6, 132; 369/72.2, 291

[56] References Cited

U.S. PATENT DOCUMENTS

| | | | |
|---|---|---|---|
| 4,679,106 | 7/1987 | Okita et al. | 360/99.06 |
| 4,876,619 | 10/1989 | Suzuki | 360/133 |
| 5,109,308 | 4/1992 | Kukreja et al. | 360/96.5 |

FOREIGN PATENT DOCUMENTS

| | | |
|---|---|---|
| 0406943 | 1/1991 | European Pat. Off. . |
| 0438144 | 7/1991 | European Pat. Off. . |
| 0444623 | 9/1991 | European Pat. Off. . |
| 0498502 | 8/1992 | European Pat. Off. . |
| 0514983 | 11/1992 | European Pat. Off. . |
| 3433705 | 4/1985 | Germany . |

*Primary Examiner*—A. J. Heinz
*Assistant Examiner*—David D. Davis
*Attorney, Agent, or Firm*—Nixon & Vanderhye

[57] ABSTRACT

A recording and reproducing device includes a first lever and a second lever. The first lever has a projection on the free end and a first rotating shaft on the fixed end. The projection comes into contact with the slider of a cassette and open the slider. The second lever has a first rotating shaft on one end, a second rotating shaft at the central portion thereof, and has a restricting member on the other end, for restricting the rotary movement of the first lever. With this arrangement, an increased radius of rotation of the projection and an increased angular moment are achieved when the cassette is pushed into the device and the movement of the slider is started. Therefore, reduced power is required to push the first lever when starting the movement of the slider.

17 Claims, 21 Drawing Sheets

DEVICE FOR HOLDING A CASSETTE HAVING A SLIDER AND A CASSETTE HAVING NO SLIDER

This is a continuation of application Ser. No. 07/986,517, filed Dec. 7, 1992, now abandoned.

FIELD OF THE INVENTION

The present invention relates to a recording and reproducing device with a slider moving mechanism for moving the slider of a cassette which covers an opening formed in the base of the cassette holding a recording medium such as a magnetic tape.

BACKGROUND OF THE INVENTION

Recording and reproducing devices for compact cassettes (hereinafter referred to as C-cassettes) have been widely used. The C-cassettes hold a magnetic tape on/from which audio analog signals are recorded/reproduced. In consideration of the C-cassette format, tape material and the analog recording system, however, a further improvement in the quality of reproduced sound is not expected.

To improve sound quality, in recent years, a recording and reproducing device, namely R-DAT (Rotary Head Digital Audio Tape Recorder) is developed. The R-DAT performs recording and reproduction by a helical lead system in which audio signals are converted into digital signals, and recorded and reproduced by a rotary head.

The R-DAT records and reproduces digital signals and performs various error corrections. Therefore, the R-DAT gives a more accurate or less distorted reproduction of the original sound in comparison to the sound reproduced by C-cassette recording and reproducing devices. In other words, the quality of sound reproduced by the R-DAT is much better than that reproduced by the C-cassette recording and reproducing devices.

However, in spite of improved sound quality, the R-DAT is not so widely used due to the following reasons.

One of the reasons is that the R-DAT system is designed without considering compatibility with the conventional widely spread C-cassette format. It is therefore difficult to produce R-DATs compatible with C-cassettes. Another reason is high prices of cassettes holding a magnetic tape for R-DAT.

Recently, there has been a proposal to develop a recording and reproducing device which digitally records or reproduces information on a magnetic tape contained in a cassette whose dimensions are substantially equal to those of C-cassettes. A recording and reproducing device capable of operating with the digital cassette (hereinafter referred to as D-cassette) is easily made compatible with both the D-cassettes and the C-cassettes.

In addition, although the D-cassettes have dimensions similar to those of the C-cassettes, various measures are taken to improve the running of a magnetic tape in the D-cassettes, thereby enabling faithful digital recording and reproduction.

The following description discusses the dimensions of the C-cassette and the D-cassette. Both of them are substantially rectangular parallelepiped containers. The length and the width of the C-cassette are equal to those of a D-cassette. The D-cassette has a thickness which is 0.9 mm greater than that of the C-cassette. The term "cassette" is simply used hereinafter in a statement referring both the D-cassette and the C-cassette,.

As shown in FIG. 17, an opening 41″c is formed in the base of a C-cassette 41″. Recording and reproduction are performed by inserting into the opening 41″c a magnetic recording and reproducing head (not shown) and feeding a magnetic tape 40 held in the C-cassette 41″ past the head.

In contrast, as shown in FIG. 18, a D-cassette 41' does not have raised sections which are formed on the front and back sides of the C-cassette 41″. The D-cassette, however, includes indents 41'd which cooperate with guide elements of a cassette holder. The D-cassette 41' has reel holes 41'e formed in one side as illustrated in FIGS. 18 and 20. Since the reel holes at 41'e do not go through the other side, the D-cassette 41' is placed on a reel set of a recording and reproducing device only in a predetermined direction.

Next, the following description discusses a significant difference between the C-cassette 41″ and the D-cassette 41', namely the slider of the D-cassette 41'.

As shown in FIG. 19, a slider 41'a made of a metallic sheet for covering the opening 41'c from which a head is inserted is mounted to be movable in the longitudinal direction of the D-cassette 41'. The slider 41'a is always pushed by a spring, not shown, to cover the opening 41'c. To expose the opening 41'c by pushing the slider 41'a, the D-cassette 41' is provided with a hole 41'b. The hole 41'b is formed in a position adjacent to an edge of the slider 41'a closed. FIG. 18 shows a state in which the slider 41'a covers the opening 41'c, while FIG. 19 shows a state in which the opening 41'c is not covered with the slider 41'a.

Meanwhile, the C-cassette 41″ is not provided with a slider and therefore the magnetic tape 40 is exposed at the opening 41″c as shown in FIG. 17. The slider structure of the D-cassette 41' protects the magnetic tape from dust and electromagnetic waves.

A recording and reproducing device for use with the D-cassette 41' is described below. The recording and reproducing device has a cassette holder for carrying the D-cassette 41' between the discharge position and the record-reproduction position. It has been proposed to incorporate into such a device a mechanism for moving the slider 41'a to cover and uncover the opening 41c at the record-reproduction position by the driving force of the driving means such as a motor.

With this mechanism, however, the slider 41'a is opened after the cassette holder reaches the record-reproduction position, resulting in a longer operation time. Moreover, since the mechanism has a complicated structure, it requires a long time to control the mechanism and is difficult to manufacture a compact recording and reproducing device.

To avoid such problems, a slider moving mechanism was proposed. With this mechanism, when the D-cassette 41' is manually placed in the cassette holder, the slider 41'a is opened with the use of the force of the hand to push the D-cassette 41' into the cassette holder. In this mechanism, a rotating lever is installed on the cassette holder to open or close the slider 41'a. A slider pin for moving the slider 41'a is mounted on the free end of the lever so that the slider pin protrudes into the cassette holder. And the hole 41'b of the D-cassette 41' is formed so that the slider pin of the slider 41'a comes into contact with the hole 41'b.

With this mechanism, when the D-cassette 41' is placed in the cassette holder, the slider pin fits into the hole 41'b. When the D-cassette 41' is pushed further into the cassette holder, the lever is rotated, for example, counterclockwise and the slider pin pushes and opens the slider 41'a.

Similarly, when the C-cassette 41" is inserted into the cassette holder, the lever is rotated. However, the slider pin is installed so as not to interfere with the insertion of the magnetic head into the opening 41'c of the C-cassette 41".

The lever is pushed toward a direction in which the cassette is pushed out of the cassette holder, and pushes the cassette out of the cassette holder by a predetermined amount when discharging the cassette from the cassette holder. On the other hand, when inserting the cassette into the cassette holder, the lever is rotated against the pushing force by the use the force of the hand.

In the above-mentioned mechanism, in order to move the slider 41'a by a predetermined distance, the distance between the axis of rotation of the lever and the slider pin must be slightly longer than the predetermined distance. Furthermore, in order to reduce the size of the cassette holder and of the recording and reproducing device, it is necessary to locate the slider pin so that the straight line connecting the slider pin in the stand-by position where it is out of contact with the cassette and the above-mentioned axis of rotation is almost parallel to the cassette inserting direction.

However, when the above-mentioned straight line is almost parallel to the cassette inserting direction, the angular moment for rotating the lever is small at the beginning of inserting the cassette.

Therefore, in the above-mentioned mechanism, to rotate the lever against the force pushing the cassette out of the cassette holder, increased power is required in inserting the cassette.

SUMMARY OF THE INVENTION

An object of the present invention is to provide a compact recording and reproducing device which is capable of storing either a D-cassette with a slider or a C-cassette in its cassette holder and of recording and reproducing information on/from the cassette, and which requires reduced power when inserting the cassette into the cassette holder.

Another object of the present invention is to provide a recording and reproducing device which easily discriminates between the C-cassette and the D-cassette when inserted into the cassette holder.

In order to achieve the above object, a recording and reproducing device of the present invention for recording and reproducing information on/from a recording medium like a magnetic tape held in a cassette having an opening at which the recording medium is exposed, includes a cassette holder, and slider moving means for opening and closing the slider. The cassette holder stores and moves between a discharge position and a record-reproduction position either a D-cassette or a C-cassette of a size which is substantially equal to a size of the D-cassette. The D-cassette has a slider for covering the opening and first pushing means for pushing the slider in a closing direction. The slider moving means includes a first rotating body, second pushing means, a second rotating body, and restricting means. The first rotating body moves the slider in an opening direction when storing the D-cassette in the cassette holder. The second pushing means pushes the first rotating body in a direction in which the cassette stored in the cassette holder is discharged. The second rotating body has a first rotating shaft of the first rotating body. The restricting means restricts the rotation of the first rotating body. With this configuration, a radius of rotation of the first rotating body at the beginning of the rotary movement of the first rotating body when loading the D-cassette is greater than a radius of rotation of the first rotating body after the restricting means restricts the rotation of the first rotating body about the first rotating shaft.

In order to achieve another object, the recording and reproducing device further includes detecting means for detecting an angle of rotary movement of the first rotating body.

With this configuration, the first rotating shaft is placed out of an imaginary line extending through the second rotating shaft in a cassette inserting direction, and on a line which extends orthogonally to the imaginary line through the second rotating shaft.

With this arrangement, during the insertion of the D-cassette in the cassette holder, the first rotating body has a greater radius of rotation and increased angular moment compared to those in a conventional device when starting the movement of the slider in an opening direction.

It is thus possible to move the slider in the opening direction against the force of the first pushing means and of the second pushing means with reduced power.

Then, the first rotating body is rotated. The rotary movement of the first rotating body is restricted by a restricting member so that the first rotating body is moved together with the second rotating body about the second rotating shaft and that the slider is moved in the opening direction to a predetermined position.

When starting the movement of the slider in the opening direction, the greatest power is needed. With the configuration, since the first rotating body has a greater radius of rotation and increased angular moment, reduced power is required when starting the movement of the slider in the opening direction.

Moreover, the configuration enables the C-cassette to be inserted in the cassette holder with reduced power in the same manner as the D-cassette is inserted.

Namely, the configuration enables a cassette to be inserted in the cassette holder without causing the slider moving mechanism to be larger.

In addition, when the detecting means is incorporated, for example, the first rotating body is not rotated if the cassette holder does not store the cassette. Therefore, an angle of the rotary movement when the cassette holder stores no cassette differs from that of the rotary movement when the cassette holder stores a cassette.

When the D-cassette is stored, the first rotating body comes into contact with an edge of the slider and is moved to open the slider. Meanwhile, when the C-cassette is stored, the first rotating body slides over the base of the C-cassette.

Therefore, an angle of rotary movement of the first rotating body when the cassette holder stores the D-cassette is different from that when the cassette holder stores the C-cassette. Thus, the detecting means easily detects whether the cassette holder stores the D-cassette or C-cassette by detecting the angle of rotary movement of the first rotating body.

Furthermore, the recording and reproducing device of the present invention may incorporate a slider moving mechanism of different type. The above-mentioned slider moving mechanism includes: moving means for opening the slider when the D-cassette is stored in the cassette holder; second pushing means for pushing the moving means in an opening direction of the slider; a gear section which rotates together with the moving means about the axis of rotation of the moving means; and a rack gear section which faces the gear section and moves with a movement of the cassette holder. The moving means comes into a lock position where the edge of the free end of the moving means fits into the hole when a tooth section of the gear section meshes with the rack gear section, and rotates to open the slider when the rack gear moves.

At this time, since the second pushing means pushes the moving means in the opening direction of the slider, the force of the second pushing means and the force of the first pushing means balance out.

Accordingly, when moving the cassette holder from the discharge position to the record-reproduction position, the cassette holder is not affected by the force of the first pushing means. Thus, the D-cassette is pushed into the cassette holder with reduced power.

For a fuller understanding of the nature and advantages of the invention, reference should be made to the ensuing detailed description taken in conjunction with the accompanying drawings.

DESCRIPTION OF THE EMBODIMENTS

A recording and reproducing device of the present invention records and reproduces information on/from conventional analog compact cassettes (C-cassettes) and digital compact cassettes (D-cassettes).

EMBODIMENT 1

The following description discusses one embodiment of the present invention with reference to FIGS. 1 through 7.

Figure 1:
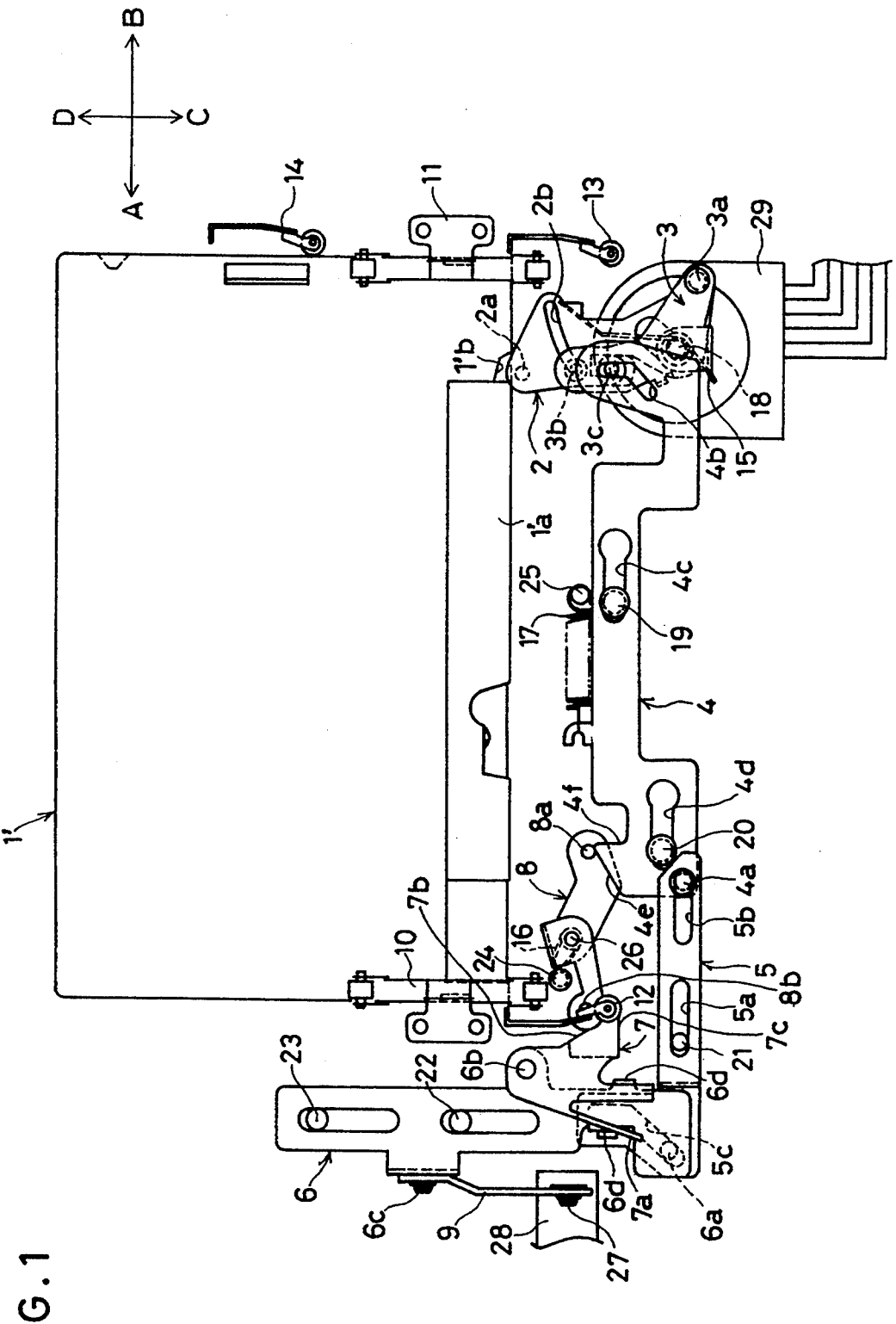
FIG. 1 is a plan view showing essential sections of a recording and reproducing device of a first embodiment and of a second embodiment the present invention in a stand-by state.

A recording and reproducing device shown in FIG. 1 has a cassette holder (not shown) which moves a cassette between a discharge position and a record-reproduction position. The discharge position is also a loading position of the cassette.

This recording and reproducing device is compatible with a D-cassette $1'$ which has an opening $1'c$ for the insertion of a magnetic head, and a slider $1'a$ which is movable in the longitudinal direction of the D-cassette $1'$ and always pushed by a spring (first pushing means), not shown, to cover the opening $1'c$. When the D-cassette $1'$ is loaded into the cassette holder, the slider arm (first rotation body) 2 mounted in the cassette holder moves the slider $1'a$ to uncover the opening $1'c$.

To perform this operation, a slider arm pin (projection) $2a$ is mounted on the free end of the slider arm 2 so that it projects into the cassette holder, and moves the slider $1'a$ by pushing an edge of the slider $1'a$. A fixed end of the slider arm 2 is attached rotatably to an end of a shaft $3a$ (first rotating shaft) mounted on an end of a substantially L-shaped lever (second rotation body) 3.

A guide slot $2b$ curving in an arc about the shaft $3a$ is formed in a portion of the slider arm 2 between the slider arm pin $2a$ and the shaft $3a$ rather close to the slider arm pin $2a$. A guide shaft (restricting member) $3b$ mounted on the other end of the lever 3 is inserted into the guide slot $2b$ to restrict the movement of the slider arm 2 round the shaft $3a$.

The slider arm 2 is always pushed in a direction in which the cassette is pushed out of the cassette holder, for example, in a clockwise direction by a spring (second pushing means) 15. Therefore, when the slider arm 2 is in a stand-by position where it does not make contact with the cassette, the guide shaft $3b$ comes into contact with an end of the guide slot $2b$. At this time, a lock lever 4 controls the position of the lever 3 as to be described later.

When the D-cassette $1'$ is loaded in the cassette holder, in the stand-by position the slider arm pin $2a$ fits into the hole $1'b$ formed in a position of the D-cassette $1'$ adjacent to the edge of the slider $1'a$, comes into contact with and pushes the edge of the slider $1'a$ to move the slider $1'a$.

A near central section of the lever 3 is attached to a shaft (second rotating shaft) 18 mounted on the cassette holder. A braking pin $3c$ mounted in the vicinity of the guide shaft 3b of the lever 3 fits into a substantially J-shaped slot 4b formed in one end of the lock lever 4.

The lock lever 4 is pushed toward the lever 3, i.e., in the B direction shown in the drawing, by a spring 17. The spring 17 is connected to the lock lever 4, and to a pin 25 as a hook, mounted on the cassette holder. Guiding shafts 19 and 20 mounted on the cassette holder are inserted into long guide holes 4c and 4d extending in the A-B direction, respectively to restrict the moving direction and distance.

Accordingly, when the lever 3 moves counterclockwise against the force of the spring 17, the counterclockwise movement of the lever 3 moves the lock lever 4 in the A direction since the braking pin 3c fits into the slot 4b.

Moreover, a near central section of a substantially V-shaped lever 8 for locking the lock lever 4 at a predetermined position is supported movably by a shaft 26 mounted on the cassette holder. One of the ends of a spring 16 is connected to the lever 8, while the other end thereof is connected to a shaft 24 mounted on the cassette holder.

Thus, the lever 8 is always pushed in a clockwise direction and located in position when a shaft 8a mounted on an end of the lever 8 comes into contact with a slanting section 4e of the other end (i.e. left end in the drawing) of the lock lever 4. Meanwhile, an unlock pin 8b is mounted at the other end of the lock lever 8.

A door lever 6 which interlocks with the cassette holder is installed so that, when the cassette holder is closed or opened, it is moved in the C-D direction along a pair of guide pins 22 and 23 mounted along the C-D direction on the cassette holder.

In addition, since a shaft 27 mounted on a cabinet 28 is connected to a shaft 6c on the door lever 6 with a joint lever 9, the door lever 6 is moved in the C-D direction when the cassette holder is closed or opened.

Furthermore, a substantially V-shaped unlock lever 7 which interlocks with the door lever 6 is provided. The top of the unlock lever 7 is movable round a shaft 6b attached to the door lever 6.

One end of the unlock lever 7 is separated to form a panel section 7a. The separated end including the panel section 7a fits between a pair of opposing stand sections 6d that are formed by bending sections of the door lever 6. Since the panel section 7a has a spring property, the unlock lever 7a produces a pushing force against the clockwise moving force round the shaft 6b.

Meanwhile, The other end of the unlock lever 7 is formed by a sloping surface 7b and an adjacent contact surface 7c along the A-B direction. The movement of the lever 8 is controlled by causing the sloping surface 7b or the contact surface 7c to come into contact with the unlock pin 8b.

Installed inside the cassette holder are cassette guides 10, 11, 12, 13 and 14. Each of the cassette guide presses a cassette loaded to fix its position. These cassette guides 10, 11, 12, 13, and 14 enable the cassette holder to store not only the D-cassette 1' but also the C-cassette 1''.

Figure 2:
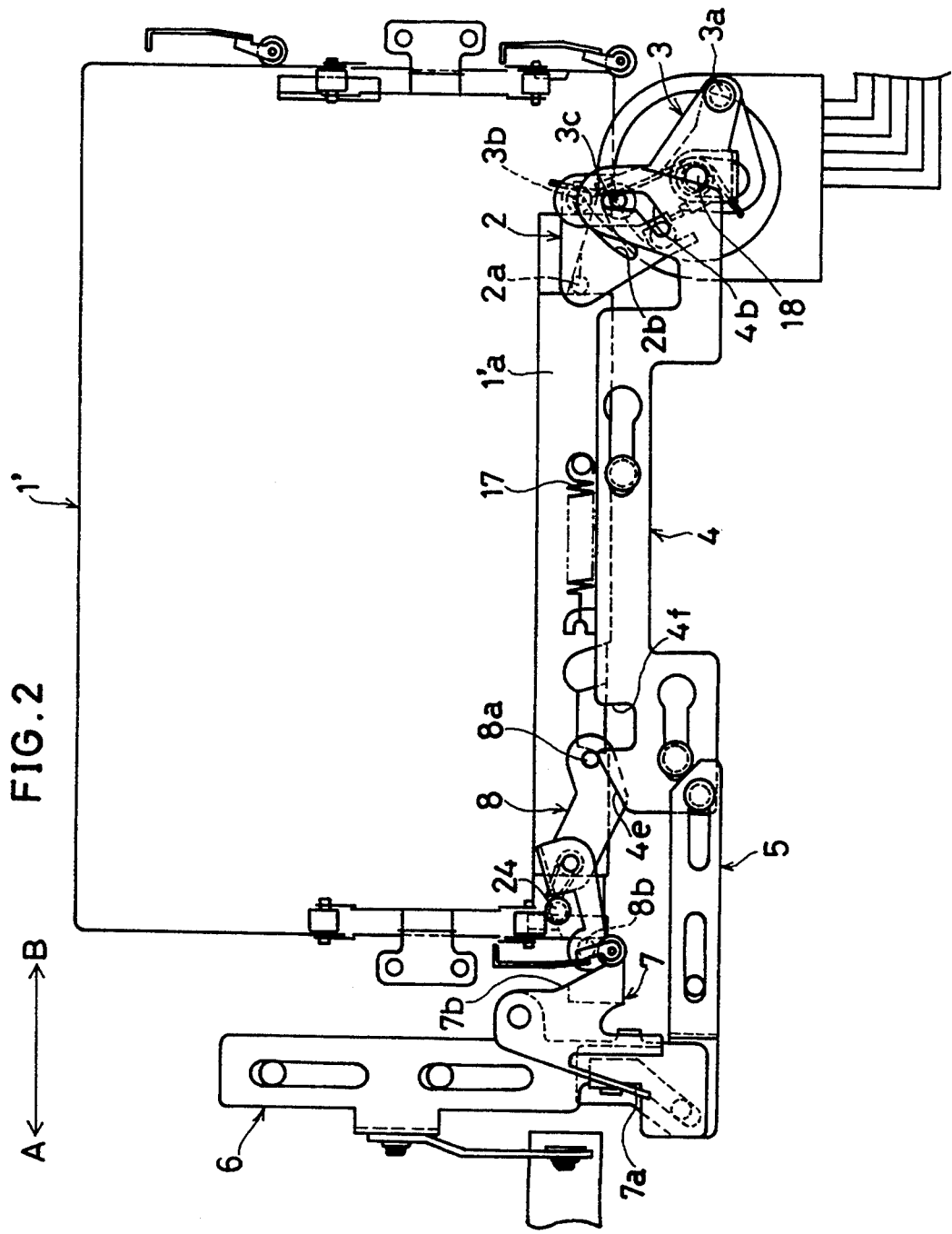
FIG. 2 is a plan view showing the essential sections of the recording and reproducing device when the device performs an operation.

Next, the following description discusses the operation of the above-mentioned device when the D-cassette 1' is loaded. When the D-cassette 1' is manually pushed into the cassette holder, the slider arm pin 2a fits into the hole 1'b. When the D-cassette 1' is further pushed, the slider arm 2 is moved counterclockwise round the shaft 3a and the slider arm pin 2a comes into contact with an edge of the slider 1'a as shown in FIG. 2. Then, the slider 1'a is moved in the A direction.

When the guide shaft 3b moves along the guide slot 2b, the slider arm 2 is moved in a great arc round the shaft 3a. At this time, the shaft 3a is displaced largely, compared to a conventional operation, from an imaginary line extending through the slider arm pin 2a in the stand-by position in a direction in which the cassette is pushed into the cassette holder.

This arrangement allows the slider arm 2 to have a large rotation moment and the cassette to be pushed into the cassette holder by a significantly reduced power when starting the movement of the slider arm 2.

Figure 3:
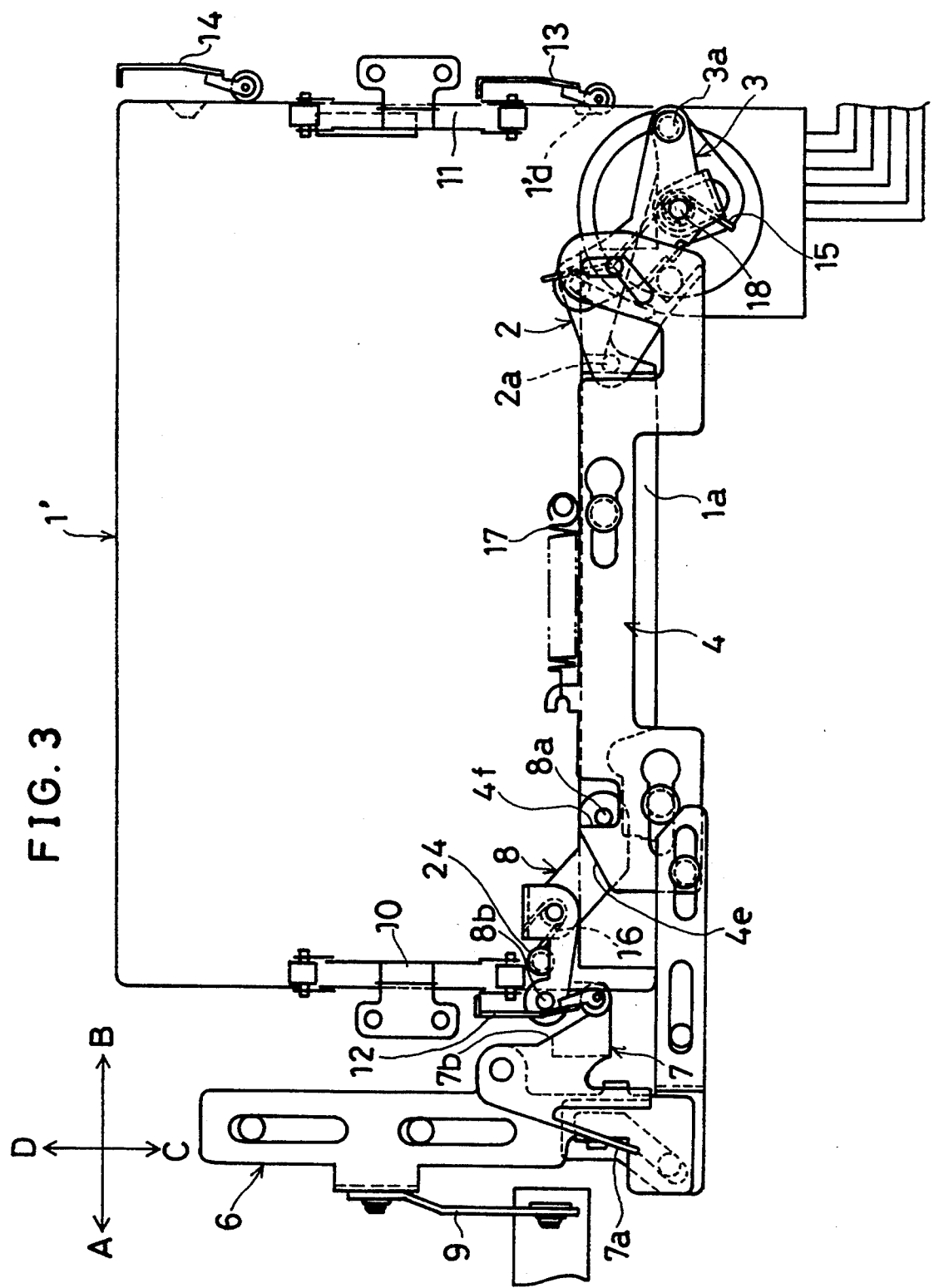
FIG. 3 is a plan view showing the essential sections of the recording and reproducing device when the device performs another operation.

Then, the D-cassette 1' is further pushed to cause the guide shaft 3b to come into contact with the right end of the guide slot 2b. As shown in FIG. 3, the slider arm 2 is moved together with the lever 3 in a counterclockwise direction round the rotation axis 18 and the slider 1'a is moved to a predetermined position.

The movement of the lever 3 causes the lock lever 4 to move the lever 8 in the A direction while moving it counterclockwise by the braking pin 3c and the slot 4b. Since an indentation 4f is formed on the right side of the slanting section 4e, the shaft 8a is caused to come out of the slanting section 4e of the lock lever 4 and to be moved clockwise by the force of a spring 16.

Thus, the lever 8 is located in position by causing the other end of the lever 8 to come into contact with the contact shaft 24. When the shaft 8a and the indentation 4f are locked together, the movement of the lock lever 4 in the B direction by the force of the spring 17 is stopped. At this time, the cassette guides 12 and 13 respectively fit into the indentations 1'd formed in the base of the D-cassette 1' and the D-cassette 1' is loaded in a predetermined position in the cassette holder by the cassette guides 10, 11 and 14 while opening the slider 1'a.

Figure 4:
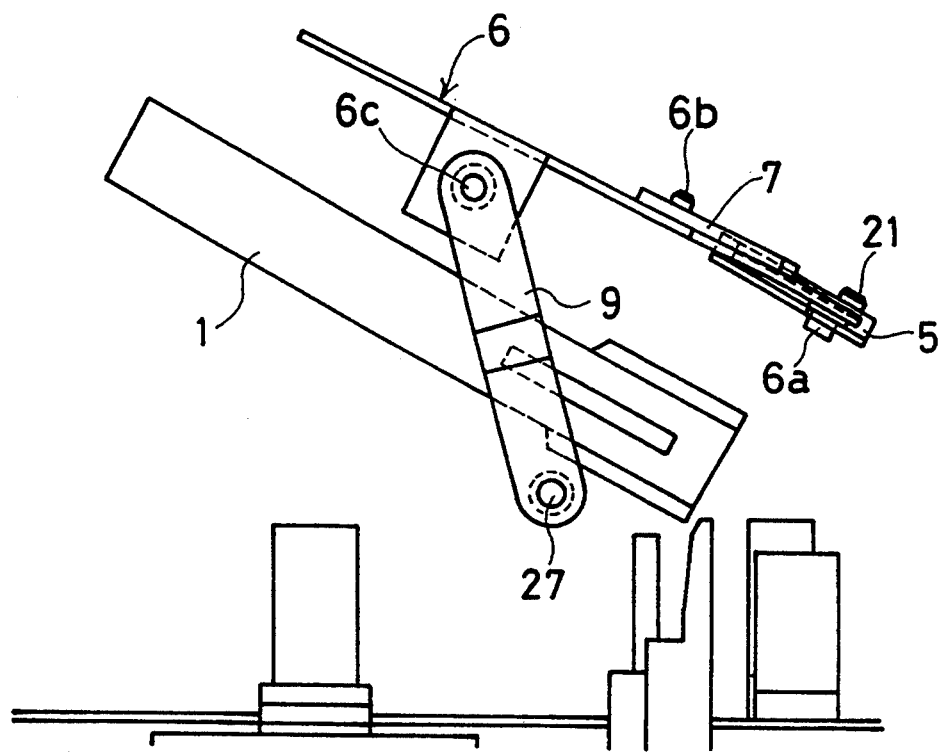
FIG. 4 is a side view showing a loading position in the recording and reproducing device.
Figure 5:
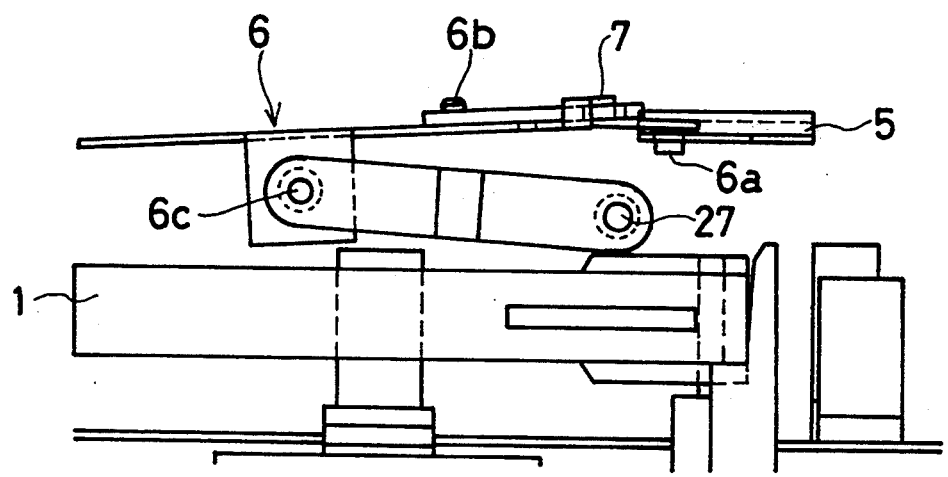
FIG. 5 is a side view showing the record-reproduction position in the recording and reproducing device.

Next, the cassette holder storing the cassette is pushed manually in the closing direction as shown in FIG. 4 to bring it in a closed state, i.e., to fix it in the record-reproduction position as shown in FIG. 5 by a locking mechanism, not shown.

At this time, with the movement of the cassette holder, the door lever 6 is moved toward the inserting direction of the cassette, namely in the D direction in the drawing by a lever 9 as shown in FIG. 3. With this movement, the unlock lever 7 attached to the door lever 6 is moved in the D direction and the unlock pin 8b comes into contact with the sloping surface 7b of the unlock lever 7.

At this time, since the shaft 8a and the indentation 4f are locked together, the unlock lever 7 is moved clockwise against the counterclockwise force of the panel section 7a.

When the unlock lever 7 is further moved in the D direction, the sloping surface 7b comes out of contact with the unlock pin 8b. This causes the panel section 7a to bring the unlock lever 7 back to the original position and the edge of the sloping surface 7b comes to the right side of the unlock pin 8b as shown in FIG. 6.

At this time, the D-cassette 1' is in the record-reproduction position with the slider 1'a opened and a magnetic head is inserted into an opening, not shown. Thus, D-cassette 1' is ready for recording and reproducing operations.

Next, the following description discusses the operations of the respective members when discharging the D-cassette 1'. First, the locking mechanism, not shown, is unlocked. Then, the cassette holder moves from the state shown in FIG. 5 with the use of its own force to return to the original state of FIG. 4 in which the cassette is ready to be taken out.

Figure 6:
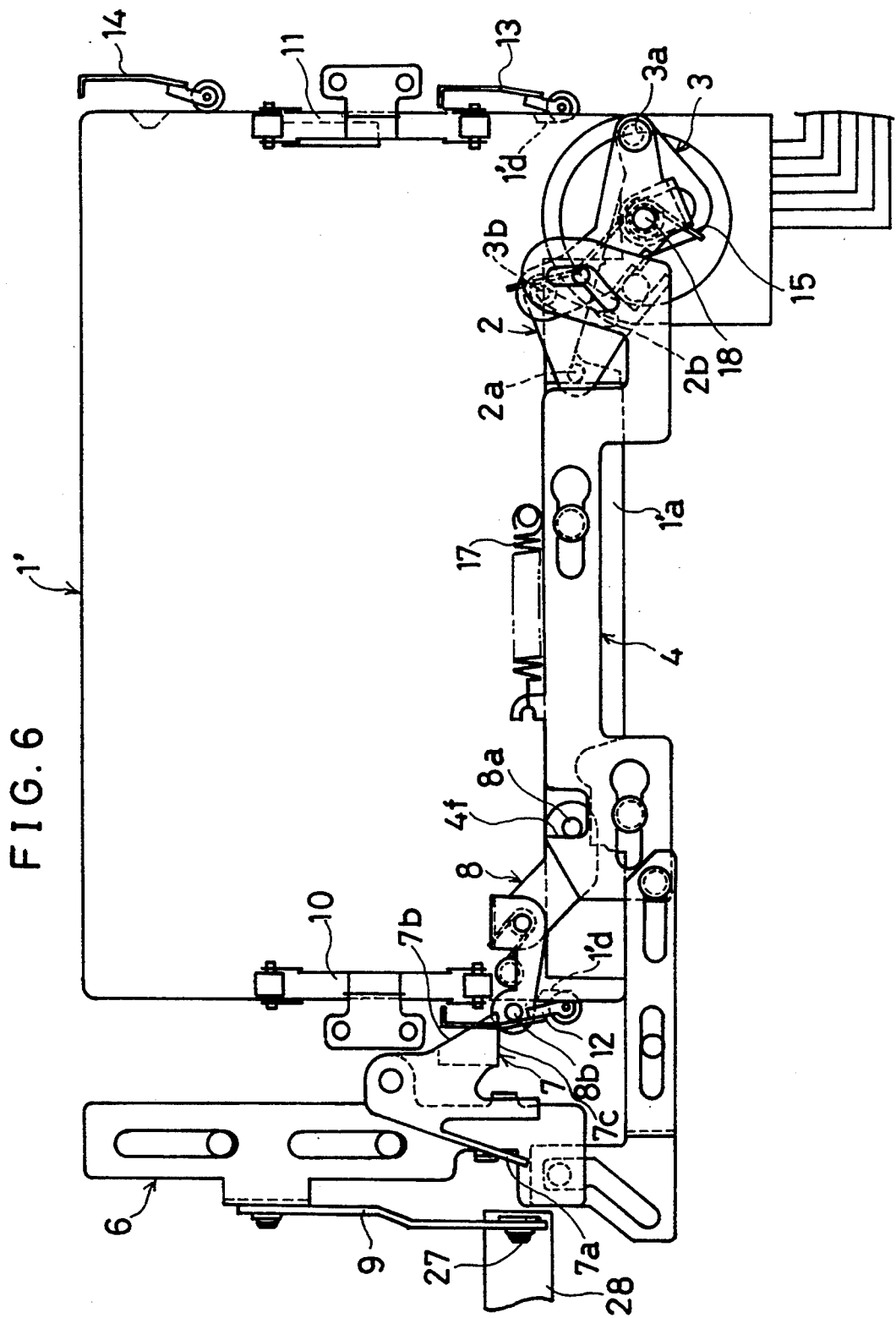
FIG. 6 is a plan view showing the essential sections of the recording and reproducing device when the device performs still another operation.
Figure 7:
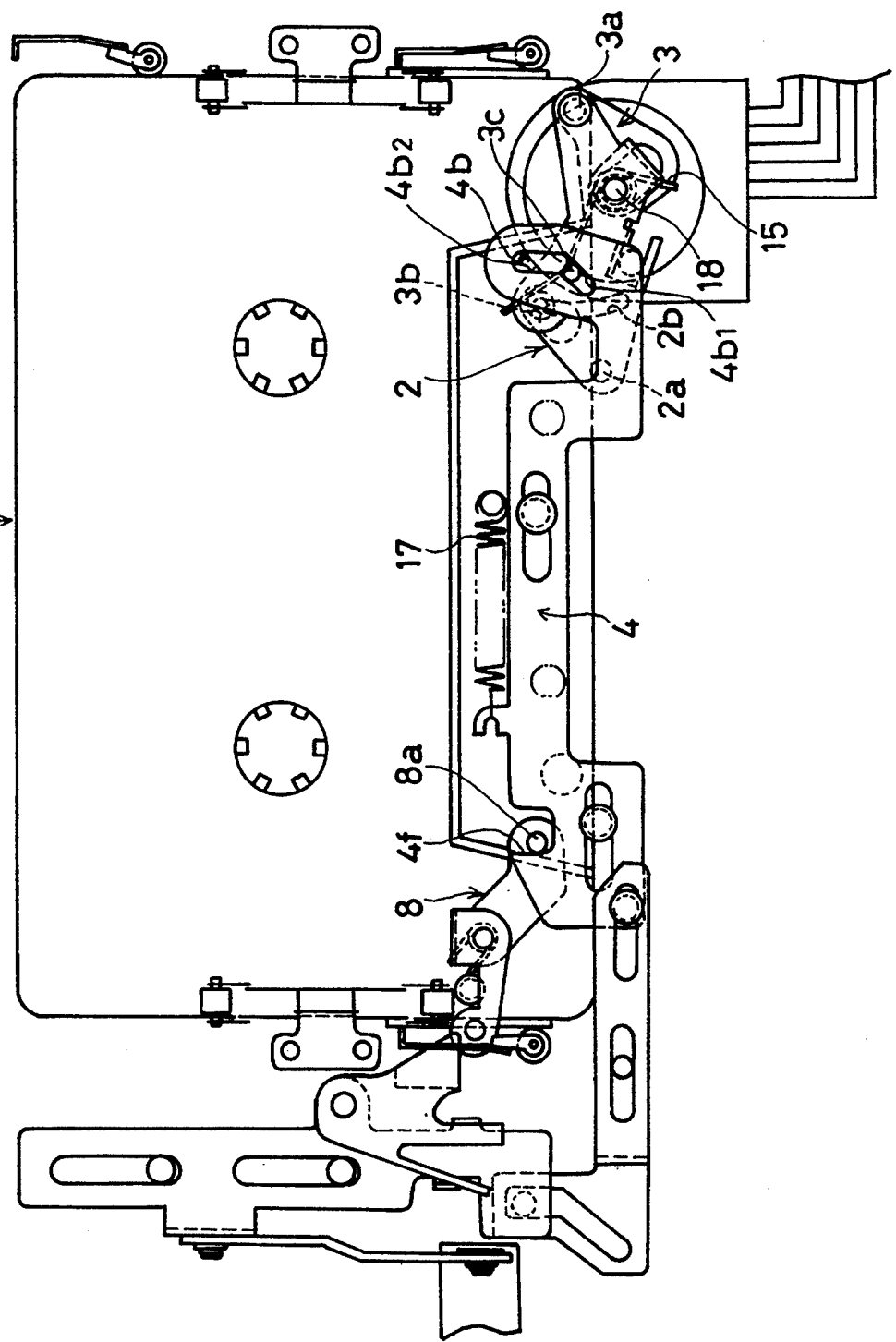
FIG. 7 is a plan view showing the essential sections of the recording and reproducing device when the device performs yet another operation.

At this time, as shown in FIG. 6, the lever 9 moves the door lever 6 in the C direction, and the unlock lever 7 is moved along with the door lever 6 in the C direction. When the contact surface 7c of the unlock lever 7 comes into contact with the unlock pin 8b, the contact surface 7c pushes the unlock pin 8b in the C direction to move the lever 8 counterclockwise.

The shaft 8a and the indentation 4f of the lock lever 4 come out of contact, thereby unlocking the lock lever 4. Consequently, the force of the spring 17 pushing the lock lever 4 in the B direction, the force of the spring 15 in a clockwise direction, and the force of the slider 1'a in the B direction respectively become greater than the power of the cassette guides 10 through 14 for holding the cassette. Then, the D-cassette 1' is moved in the D direction to the discharge position.

Next, the following description discusses the recording and reproducing of information on/from the analog C-cassette 1" stored in the cassette holder. The above-mentioned members perform the same operations as they do in recording and reproducing with the D-cassette 1'. However, unlikely from the D-cassette 1', the C-cassette 1" does not have the slider 1'a. Therefore, when the C-cassette 1" is inserted into the cassette holder, the slider arm pin 2a comes into contact with the base of the C-cassette 1' and the slider arm 2 is moved counterclockwise round the shaft 3a.

When the slider arm 2 is moved and the right end of the guide slot 2b comes into contact with the guide shaft 3b of the lever 3, the slider arm 2 is moved counterclockwise together with the lever 3 round the shaft 18. Then, when the braking pin 3c of the lever 3 comes into contact with the slot 4b, the lock lever 4 is moved in the A direction.

When the indentation 4f and the shaft 8a come into contact with each other, the lock lever 4 which has been moved in the B direction by the lock lever spring 17 is locked. In this case, since there is no hole, the amounts of movement of the slider arm 2 and the lever 3 are greater than those when the D-cassette 1' is loaded.

The slot 4b has a section 4b₁ slanting substantially along an arc round the supporting axis 18 and a straight section 4b₂ connected to the slanting section 4b₁. The straight section 4b₂ is designed so that, during loading of the C-cassette 1" when an amount of movement of the lever 3 exceeds the amount of movement of the lever 3 in loading the D-cassette 1', the braking pin 3c of the lever 3 reaches the slanting section 4b₁.

Since the amount of movement of the lever 3 is increased when loading the C-cassette 1", the lock lever 4 is moved in the A direction by a reduced amount. Thus, when loading the C-cassette 1" in the cassette holder, the lock lever 4 is moved by the same amount as it is moved when loading the D-cassette 1'.

When the C-cassette 1" is loaded in the cassette holder, the cassette holder is moved into the record-reproduction position and the magnetic head, not shown, is inserted into an opening 1"c of the C-cassette 1" to perform recording or reproducing operation. As for the discharging of the C-cassette 1", it is conducted in the same manner as the discharging of the D-cassette 1'.

The above-mentioned configuration achieves a recording and reproducing device compatible with both the C-cassette 1" and the D-cassette 1.'

Meanwhile, in a conventional device, to reduce the length and the size of the slider arm, the angle of rotation of the slider arm is increased. Moreover, in order to assure a sufficient travel distance, the stand-by position of the slider arm is set in a position where the longitudinal direction of the slider arm is substantially parallel with a direction in which the cassette is inserted into the cassette holder. And, it is arranged that, when the slider arm pin comes into contact with and opens the slider, the slider arm is moved about 90 degrees. With this configuration, since the angular moment is small when starting the movement of the slider arm, greater power is required when moving the slider arm against a force pushing the slider.

On the other hand, the recording and reproducing device of this embodiment is designed to store either the D-cassette 1' or the C-cassette 1" in the cassette holder and to perform recording and reproducing operations. This device is provided with the slider arm 2 and the lever 3 for opening and closing the slider 1'a of the D-cassette 1' and with the shaft 3a as the axis of rotation of the slider arm 2 for pushing the slider 1'a, installed on one end of the lever 3. Therefore, a radius of rotary movement of the slider arm 2 when starting the movement is greater than that of the conventional device.

Moreover, in the device of this embodiment, it is possible to displace the shaft 3a by a large amount from the imaginary line extending through the slider arm pin 2a in a direction in which the cassette is inserted into the cassette holder. Thus, when the slider arm pin 2a starts moving, a greater angular moment is achieved compared to that of the conventional device. With this configuration, after the cassette comes into contact with the slider arm 2, the cassette is smoothly pushed into the cassette holder with much less power.

In addition, the recording and reproducing device of this embodiment is very useful as it is compatible with both the D-cassettes 1' providing improved sound quality and the C-cassettes 1" which are widely used. Furthermore, it is possible to produce the recording and reproducing device of this embodiment in a compact size like conventional devices.

EMBODIMENT 2

With reference to FIGS. 1, 4, 5, 8 through 12 the second embodiment of the present invention is described below. Members in this embodiment whose function is the same as that of members in the above-mentioned embodiment are designated by the same codes and their description is omitted.

Figure 8:
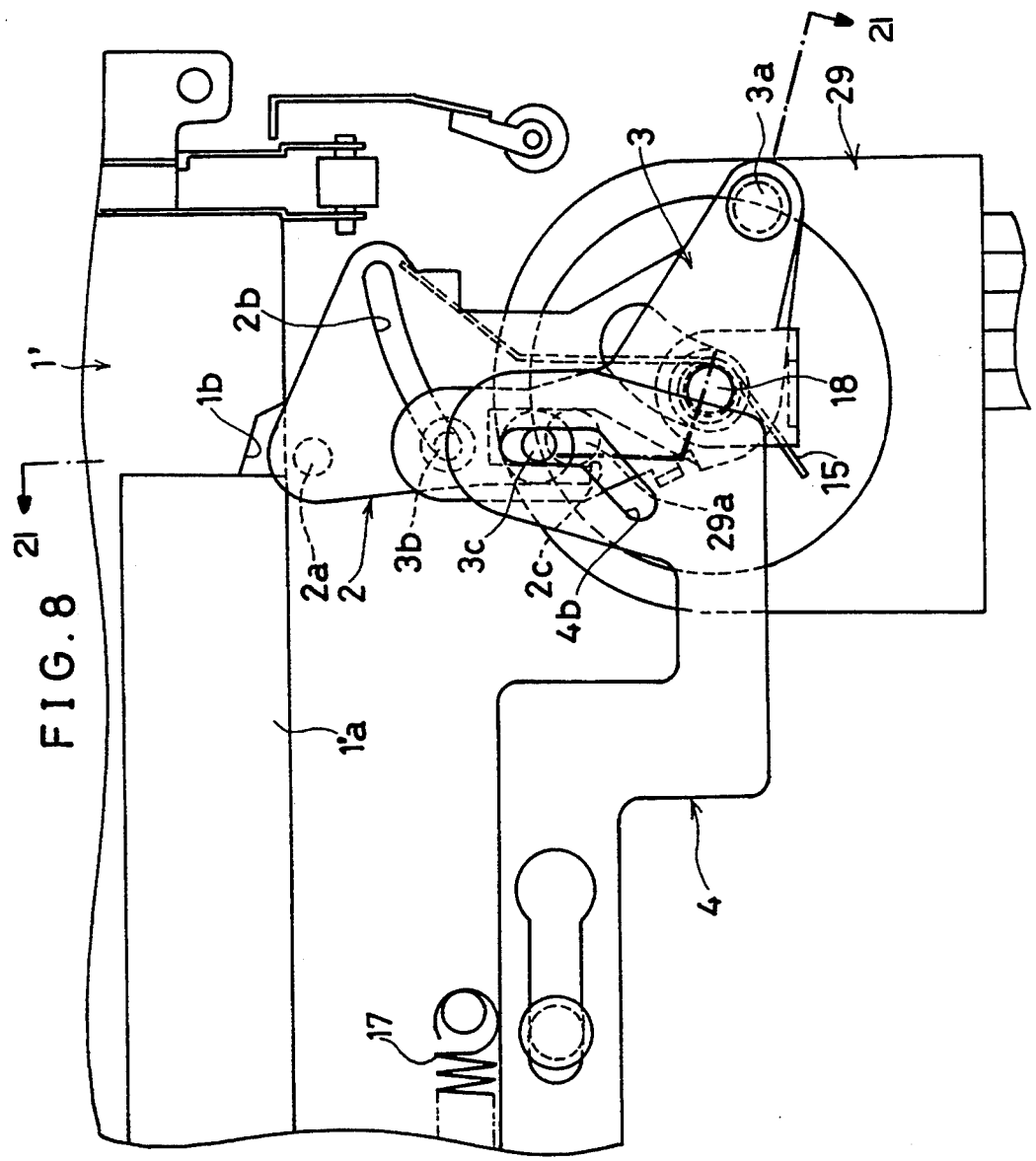
FIG. 8 is an enlarged plan view of FIG. 1.

As shown in FIG. 1, a recording and reproducing device of this embodiment has a rotary switch (detecting means) 29. The rotary switch 29 is positioned so that its rotation axis and the above-mentioned shaft 18 are coaxial. As shown in FIG. 8, there is a substantially cylindrical protrusion (detecting means) 29a on the rotary switch 29. The protrusion 29a is rotatable about the shaft 18 and inserted into a guide slot 2c formed in the slider arm 2.

Figure 9:
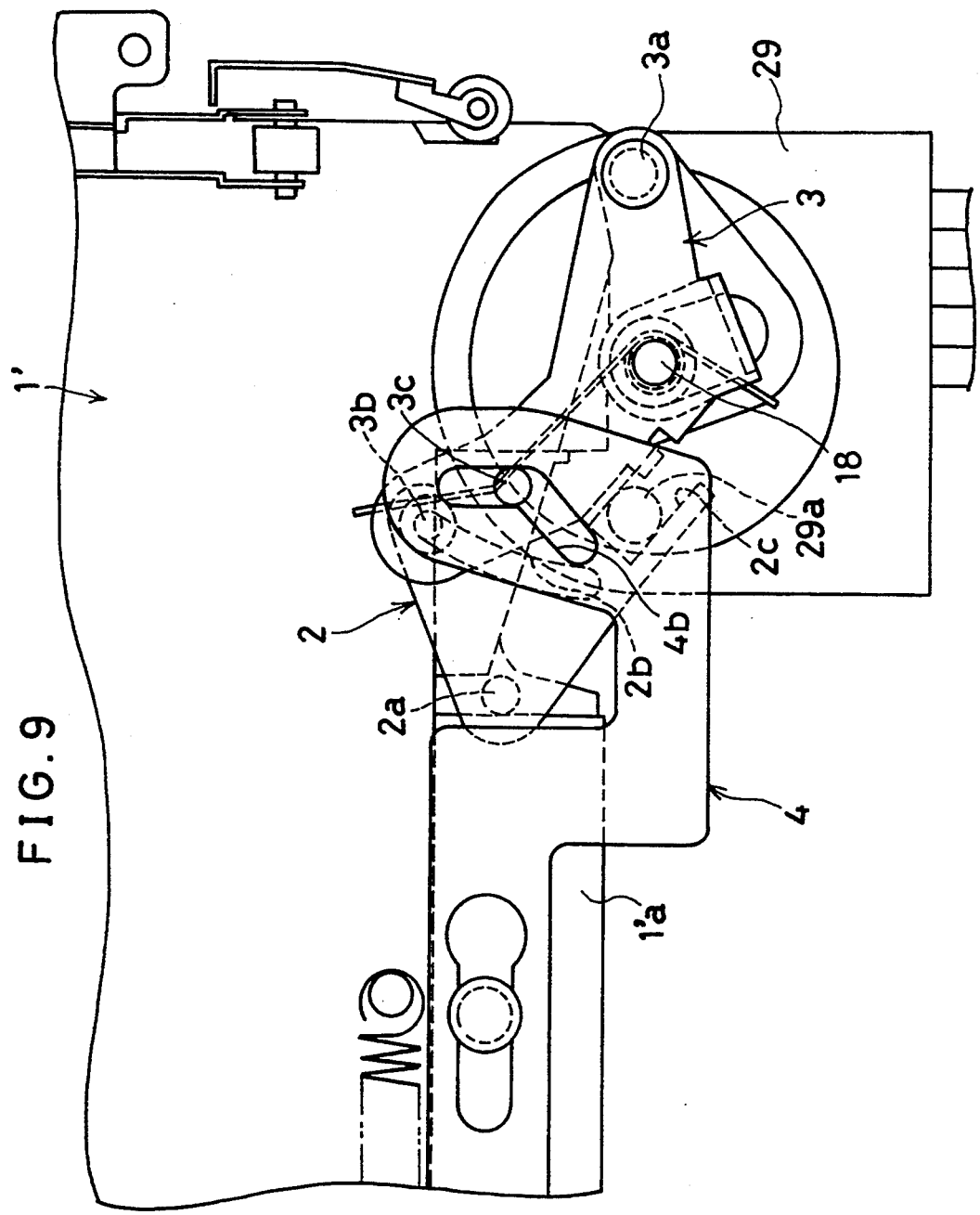
FIG. 9 is an enlarged plan view of FIG. 3.

With this arrangement, as shown in FIG. 9, when the slider arm 2 is moved, the protrusion 29a moves round the shaft 18 and the rotary switch 29 detects an angle of rotary movement of the slider arm 2. A variable resistor, a potentionmeter, an attenuator or other device capable of detecting the angle of rotary movement is used as the rotary switch 29.

Figure 10:
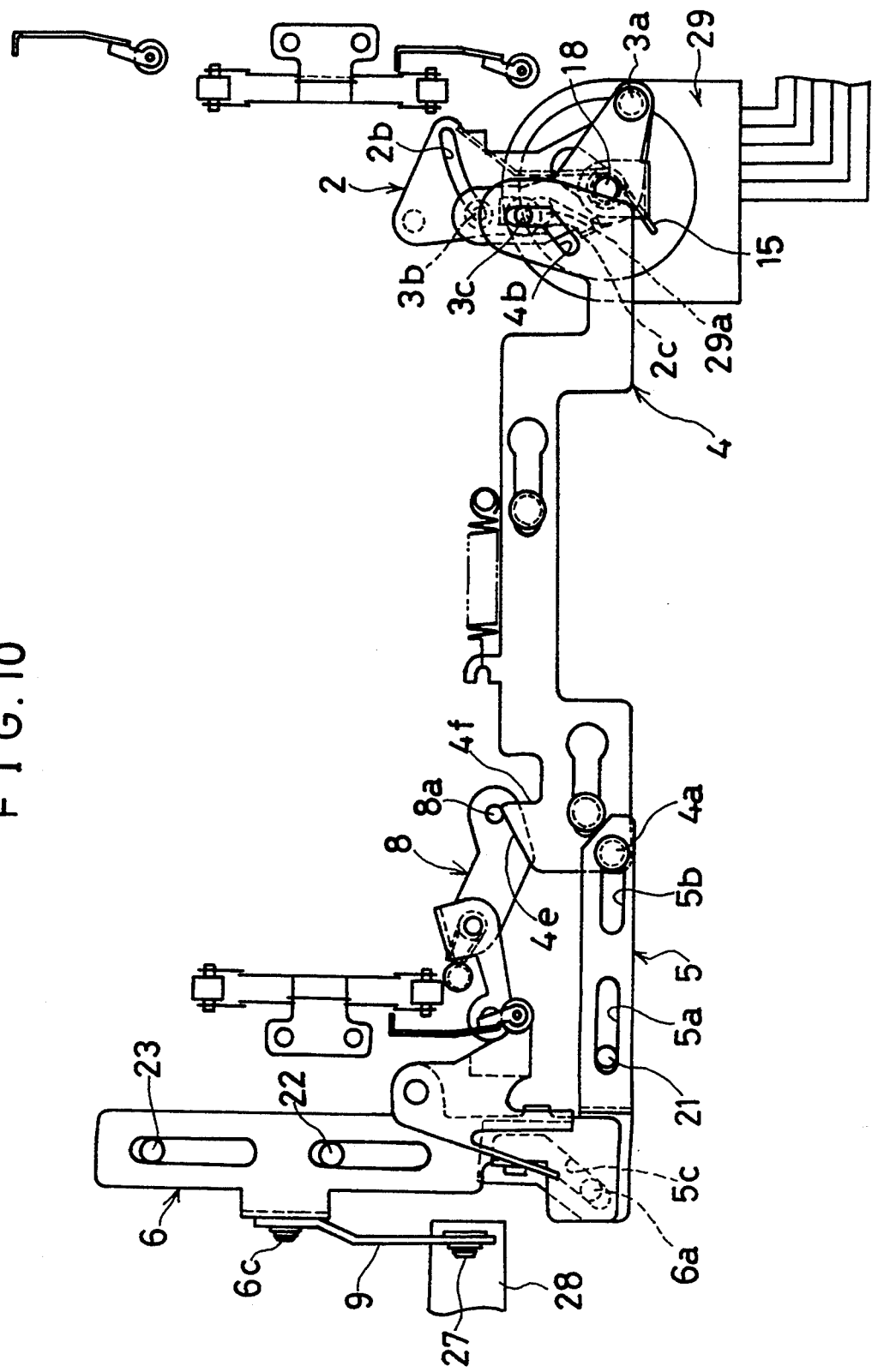
FIG. 10 is a plan view showing the essential sections of the recording and reproducing device in the loading position where a cassette is not stored.

The recording and reproducing device also has a substantially L-shaped transmission lever 5 for transmitting the movement of the door lever 6 in the C-D direction to the lock lever 4 as shown in FIG. 10. Guide holes 5a and 5b extending in the A-B direction are formed at the central portion and the right end of the transmission lever 5, while a substantially J-shaped guide hole 5c is formed at the left end of the transmission lever 5.

A guide pin 21 mounted on the cassette holder is inserted into the guide hole 5a, and a shaft 4a mounted on the left end of the lock lever 4 is inserted into the guide hole 5b. Thus, the lever is movable in the A-B direction.

A pin 6a mounted on the bottom end of the door lever 6 is inserted in the guide hole 5c. In the state where the cassette holder is open and the door lever 6 is moved in the C direction, the pin 6a comes into contact with the bottom end of the guide hole 5c, the guide pin 21 comes into contact with the left end of the guide hole 5a and the shaft 4a comes into contact with the right end of the guide hole 5b.

Next, the operation performed by the recording and reproducing device of this embodiment is described below. FIG. 4 shows the cassette holder which is open and in the cassette storing position. When moving the cassette holder into a closed state shown in FIG. 5, the lever 9 moves the door lever 6 and the pin 6a in the D direction.

Figure 11:
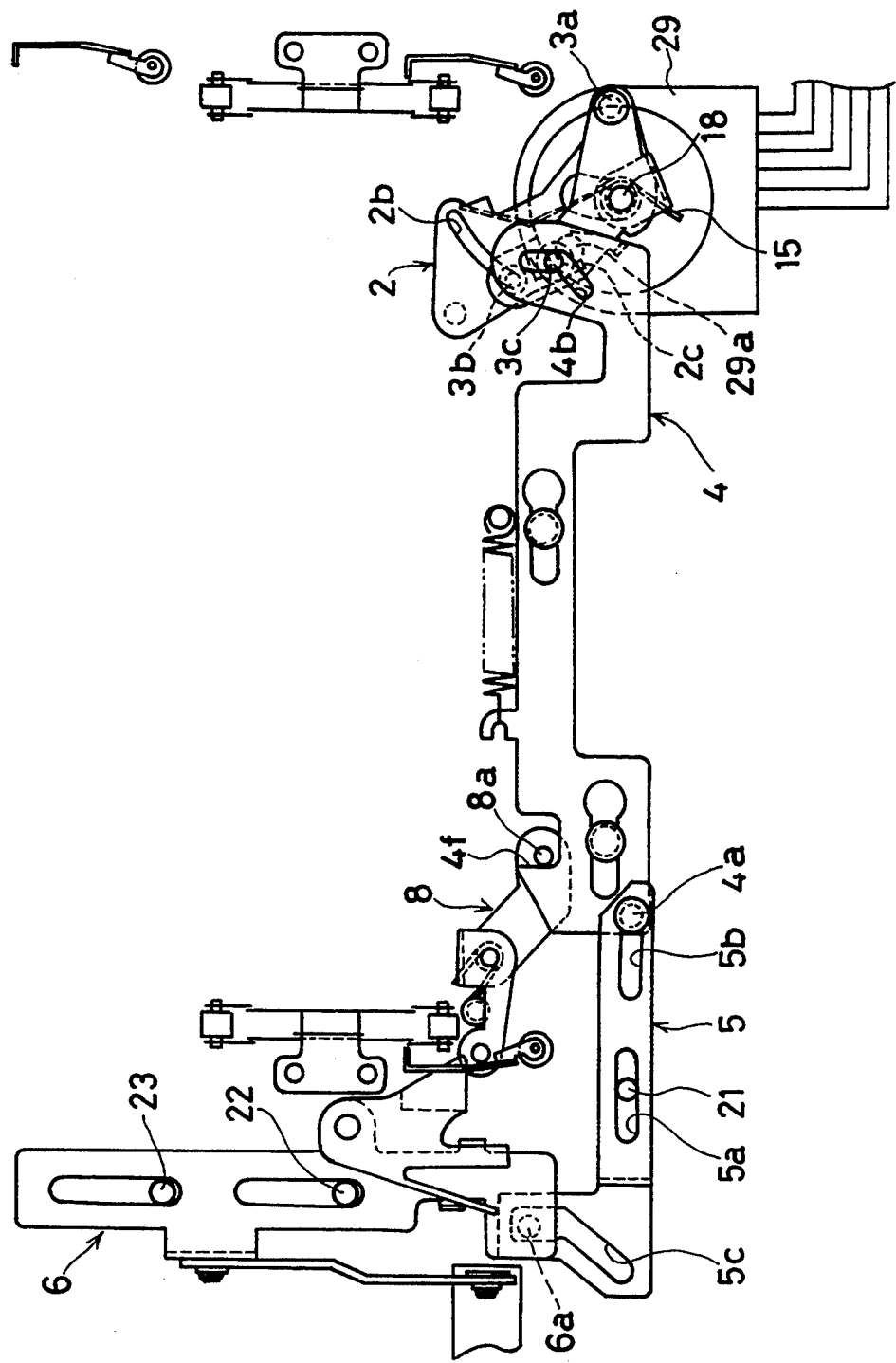
FIG. 11 is a plan view showing the record-reproduction position of the recording and reproducing device.

Then, the pin 6a slides the slanting section of the guide hole 5c, and the transmission lever 5 is moved in the A direction as shown in FIG. 11. At this time, since the shaft 4a comes into contact with the right end of the guide hole 5b, the lock lever 4 is moved in the A direction, the lever 3 and the slider arm 2 are moved counterclockwise, and the shaft 8a of the lever 8 fits into the indentation 4f and is locked with the lock lever 4.

The above-mentioned movement of the cassette holder moves the door lever 6 in the C-D direction. This movement is transmitted to the lock lever 4 through the transmission lever 5, and the lock lever 4 is moved and locked with the lever 8. Such a movement of the lever 4 moves the lever 3 to a position where it is located when the D-cassette 1' is loaded.

At this time, however, the slider arm 2 is not in contact with the cassette and pushed clockwise by the force of the spring 15. Thus, the guide shaft 3b comes into contact with the left end of the guide slot 2b.

Consequently, the angle of rotary movement of the slider arm 2 becomes smaller than that when the D-cassette 1' is loaded. The rotary switch 29 detects whether the cassette is loaded by detecting the angle of rotary movement of the slider arm 2.

Figure 12:
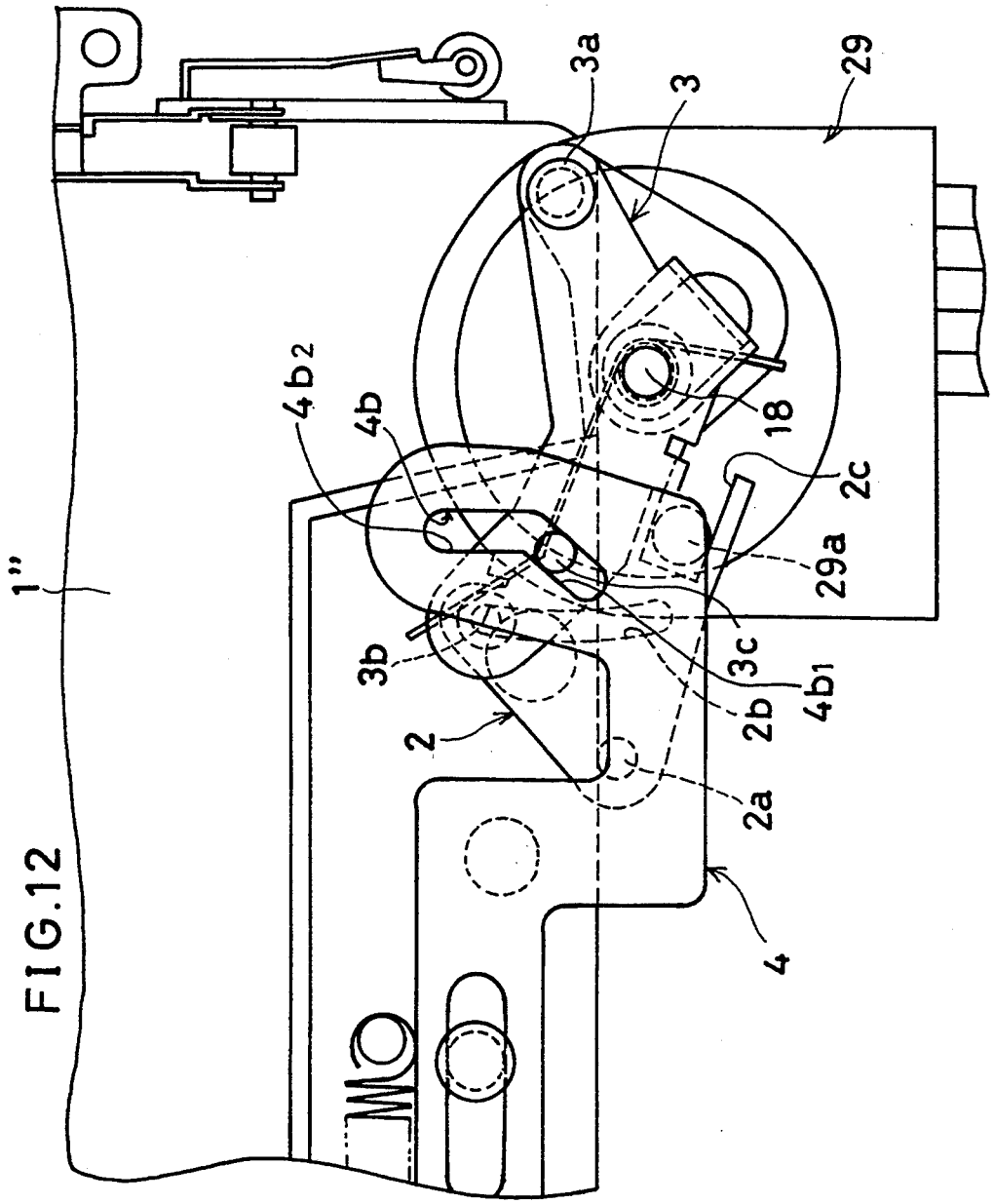
FIG. 12 is an enlarge plan view of FIG. 6.

As described in the first embodiment, when the C-cassette 1" is loaded, the slider arm 2 is moved through a larger angle compared to when the D-cassette 1' is stored as shown in FIG. 12, and the rotary switch 29 detects the larger angle of rotary movement.

As for a device which records and reproduces information on/from a magnetic tape in a digital cassette loaded in its cassette holder with a rotatory head by the helical lead system, a R-DAT is generally known. However, the R-DAT has been developed without taking the recording and reproduction of the C-cassette 1" into consideration as there are differences in shape and and recording and reproducing methods between the C-cassette 1" and the cassette for R-DAT.

Therefore, it is extremely difficult to design a R-DAT capable of playing various types of cassettes, for example, digital cassettes and the C-cassette 1". Also, the R-DAT does not include a mechanism of discriminating between cassettes of different types.

On the other hand, with the configuration of the recording and reproducing device in this embodiment, by detecting the amount of the rotary movement of the slider arm 2 with the rotary switch 29, the device easily detects four states, namely a state in which a cassette is ready to be taken out, a state in which the cassette holder is closed without holding a cassette in it, a state in which D-cassette 1' is loaded, and a state in which the C-cassette 1" is loaded in the manner as described in the first embodiment.

In addition, this configuration is easily combined with the configuration of the first embodiment to achieve a more effective recording and reproducing device which is compatible with both the C-cassette 1" and the D-cassette 1', requires reduced power to push a cassette into the cassette holder, and easily identifies the above-mentioned four states.

Furthermore, it is possible to combine the configuration of the second embodiment with a configuration other than that of the first embodiment if it has a moving member which opens the slider when the D-cassette 1' is inserted into the cassette holder.

EMBODIMENT 3

With reference to FIGS. 13 through 20 the third embodiment of the present invention is described below. Members in this embodiment whose function is the same as that of members in the above-mentioned embodiments are designated by the same codes and their description is omitted.

Figure 13:
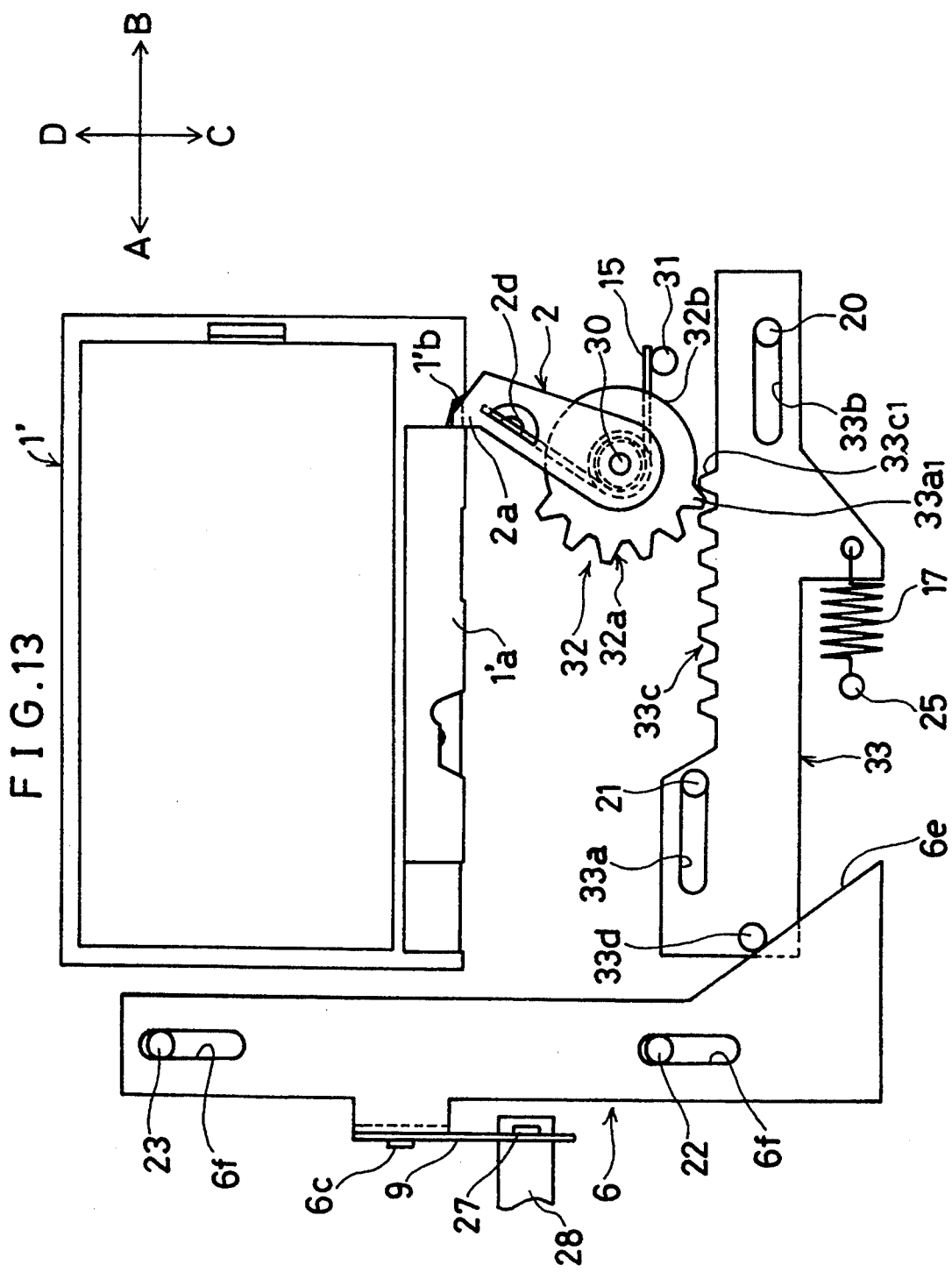
FIG. 13 is a plan view showing the essential sections of a recording and reproducing device of Embodiment 3.

As illustrated in FIG. 13, in a recording and reproducing device of this embodiment, the plate-like slider arm (moving means) 2 for moving the slider 1'a of the D-cassette 1' is mounted rotatably on the cassette holder, not shown.

A spring 15 is attached round a shaft 30 and connected to the protrusion 2d formed adjacent to the edge 2a of the slider arm 2 and to a pin 31 mounted on the cassette holder. The spring 15 always pushes the slider arm 2 toward a direction in which the slider 1'a is opened, i.e., counterclockwise.

A gear section 32 is arranged to be coaxial and to rotate together with the slider arm 2. A tooth section 32a and toothless section 32b are formed on the edge of the gear section 32.

A rack lever 33, made of a substantially rectangular plate, for changing the movement of the door lever 6 in the C-D direction into the movement in the A-B direction is mounted. Holes 33a and 33b extending in the A-B direction are formed in the rack lever 33. By inserting the guide pins 20 and 21 mounted on the cassette holder into the holes 33a and 33b, respectively, the rack lever 33 is restricted to move only in the A-B direction.

A spring 17 is connected to the rack lever 33 and a pin 25 mounted on the cassette holder so as to pull the rack lever 33 in the A direction. In this state, the guide pins 20 and 21 are in contact with the right ends of the holes 33a and 33b, respectively. In this state, the rack lever 33 is in the stand-by position.

A rack gear section 33c extending in the A-B direction is formed in the rack lever 33. A tooth $33c_1$ at the extreme right of the rack gear section 33c meshes with the tooth $32a_1$ of the tooth section 32a. In the state where the rack gear section 33c faces the tooth section 32a, when the gear section 32 rotates in a counterclockwise direction, the tooth $32a_1$ is the first to mesh with the tooth $33c_1$.

Thus, when the rack gear section 33a and the tooth section 32a are in mesh, the slider arm 2 pushed in a counterclockwise direction by the spring 15 is locked at a predetermined position where its edge 2a is slightly displaced in a clockwise direction, i.e., in the B direction from an imaginary line which is parallel to the cassette inserting direction and extends through the axis of rotation of the shaft 30.

Therefore, in loading the D-cassette 1' in the cassette holder, when the edge 2a fits into the hole 1'b, the D-cassette 1' can not be further pushed. And, the slider moving mechanism moves the slider arm 2 to open the slider 1'a and to bring the D-cassette 1' into the predetermined position as to be described later.

Figure 15:
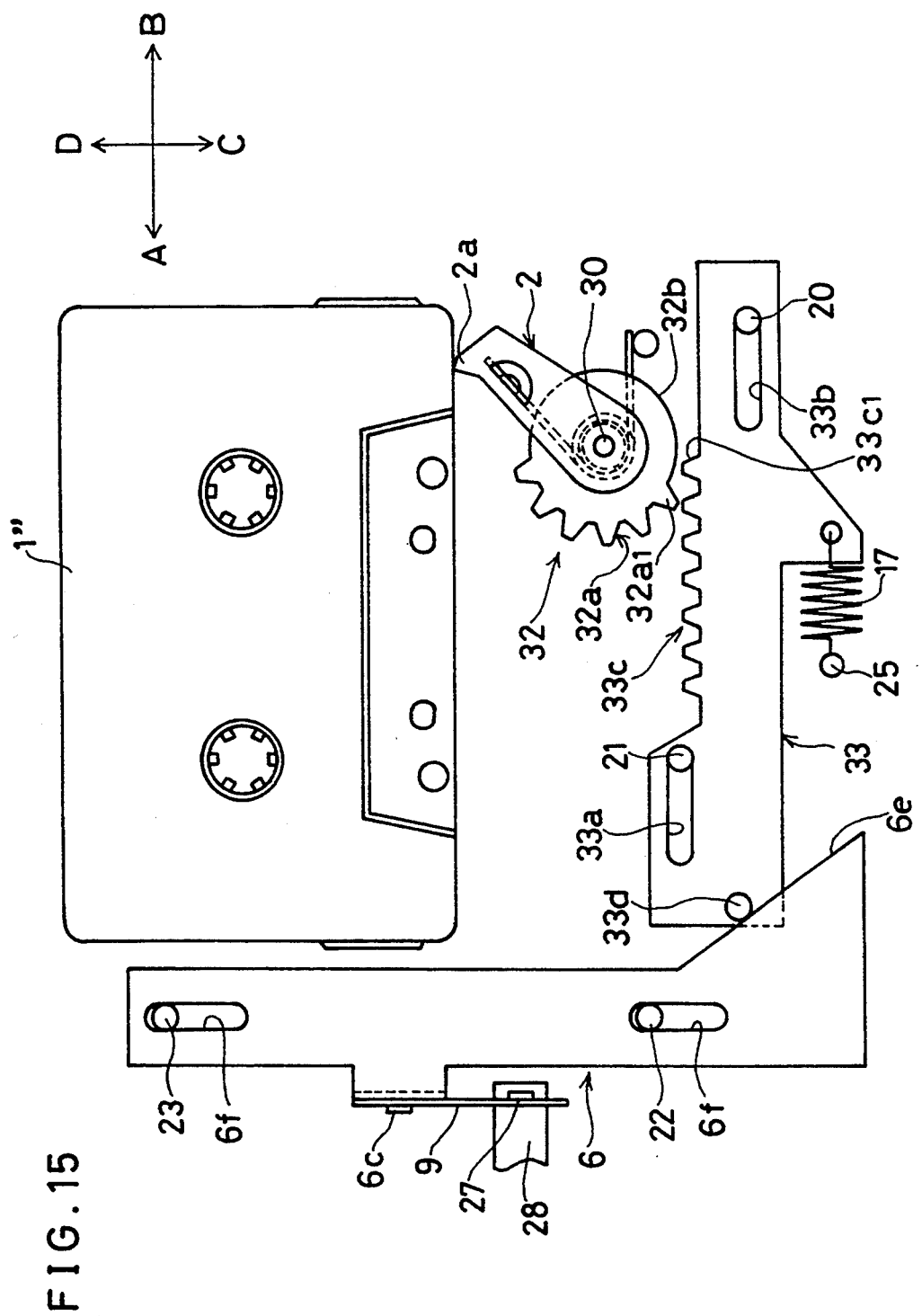
FIG. 15 is a plan view showing the essential sections of the recording and reproducing device when the device performs another operation.
Figure 16:
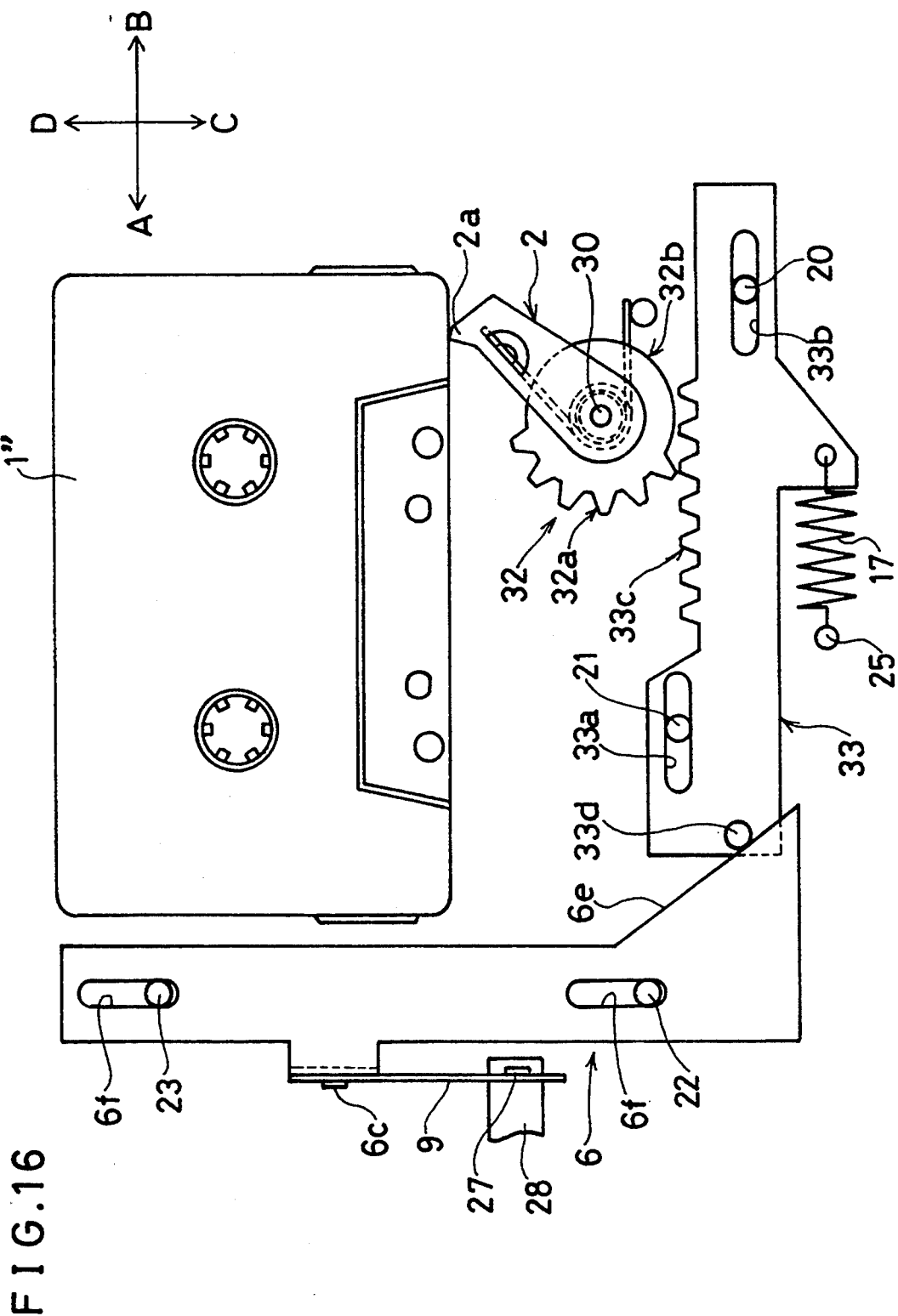
FIG. 16 is a plan view showing the essential sections of the recording and reproducing device when the device performs still another operation.
Figure 17:
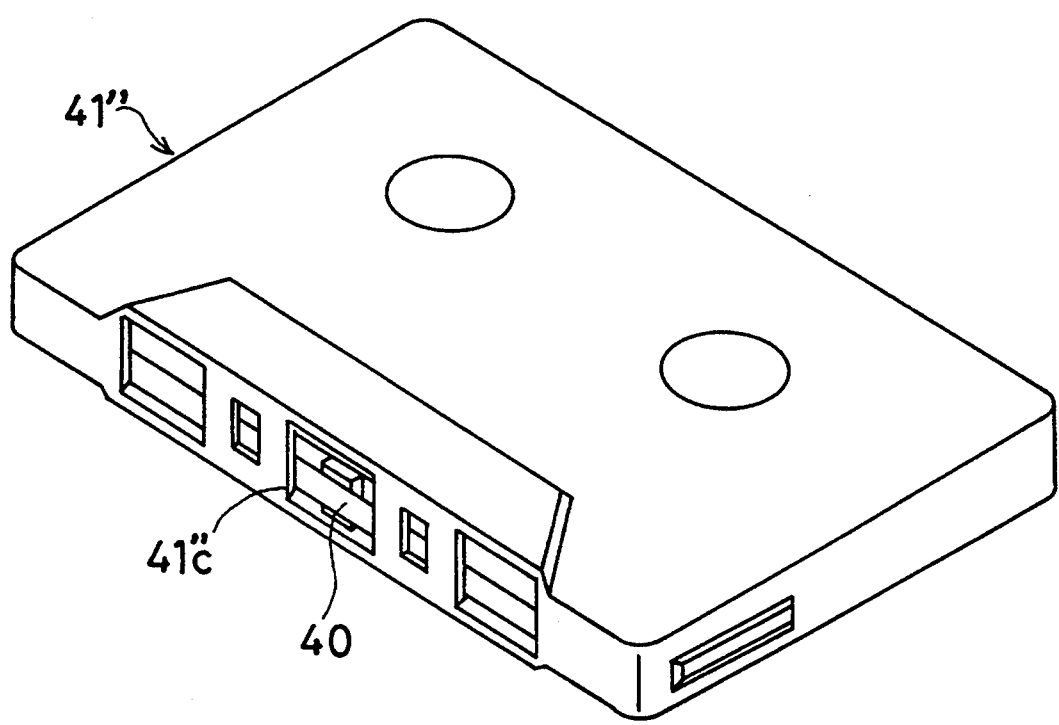
FIG. 17 is a perspective view showing a conventional C-cassette.
Figure 18:
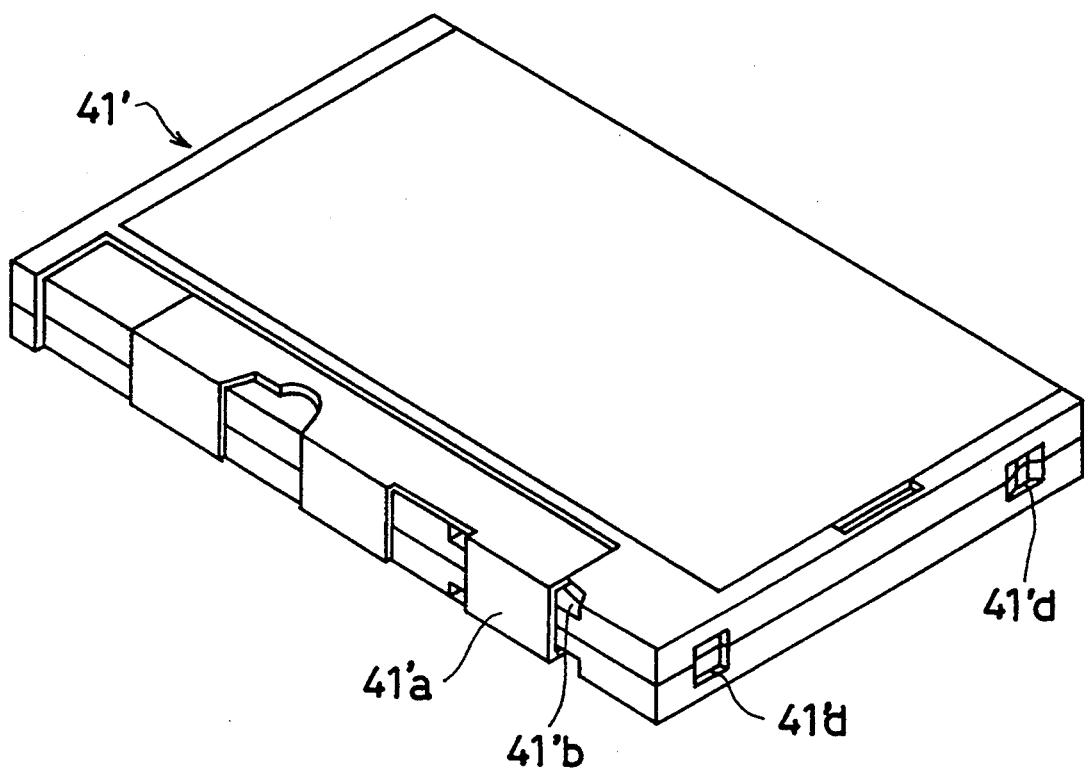
FIG. 18 is a perspective view showing a conventional D-cassette where the slider thereof is closed.
Figure 19:
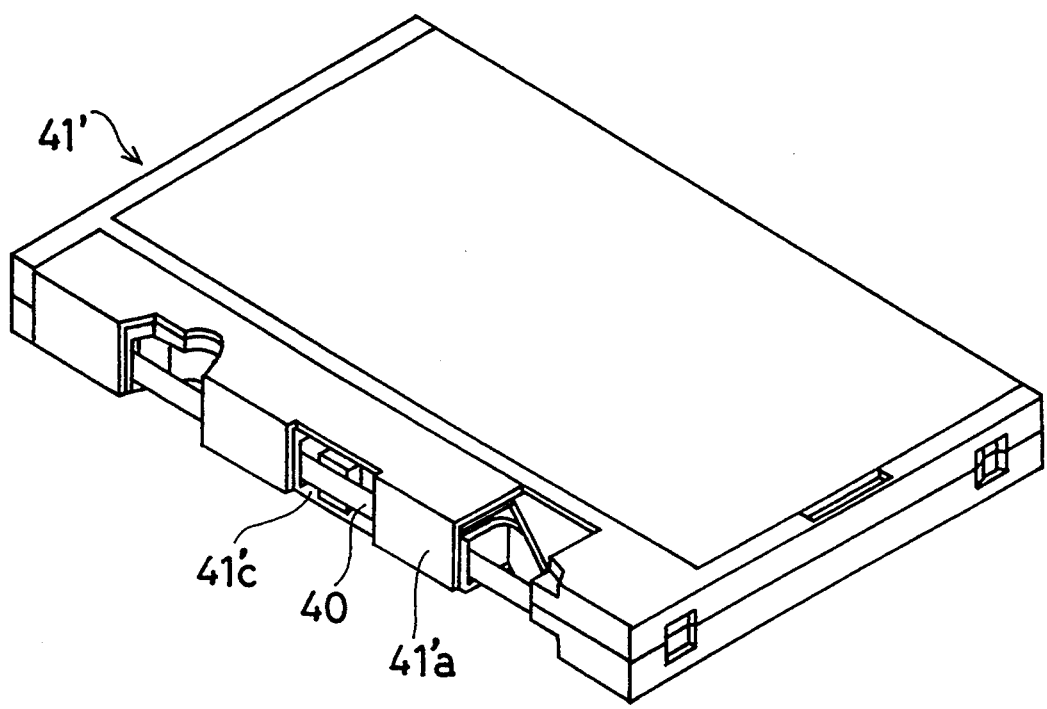
FIG. 19 is a perspective view showing the conventional D-cassette where the slider is opened.
Figure 20:
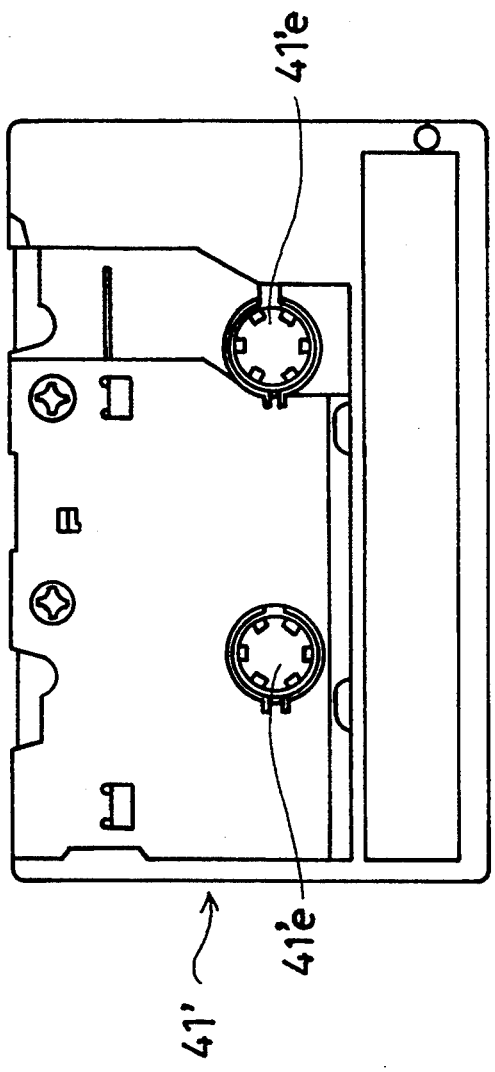
FIG. 20 is a plan view showing the conventional D-cassette when it is seen from bottom.
Figure 21:
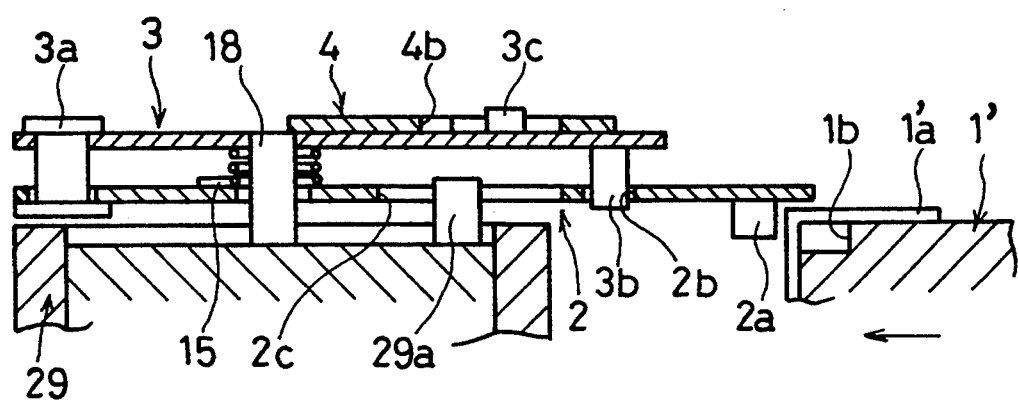
FIG. 21 is a cross section of the device illustrated in FIG. 8 viewed along section lines 21—21.

Meanwhile, as illustrated in FIG. 15, when the C-cassette 1" is loaded, the slider arm 2 is moved clockwise while making its edge 2a slide over the base of the C-cassette 1" as to be described later.

As illustrated in FIG. 13, the tooth section 32a is formed on the circumferential edge of the gear section 32 from the tooth $32a_1$ toward a clockwise direction. The tooth section 32a is designed so that, when the slider arm 2 is moved, the edge 2a comes into contact with and pushes in the A direction an edge of the slider 1'a so as to open the slider 1'a.

Mounted on the left end of the rack lever 33 is a guide shaft 33d which makes contact with the slanting transmission section 6e of the door lever 6. The movement of the door lever 6 in the D direction moves the rack lever 33 in the B direction.

Next, the following description discusses the operation of the recording and reproducing device of the third embodiment. First, when the D-cassette 1' is stored in the cassette holder, the edge 2a fits into the hole 1'b.

Figure 14:
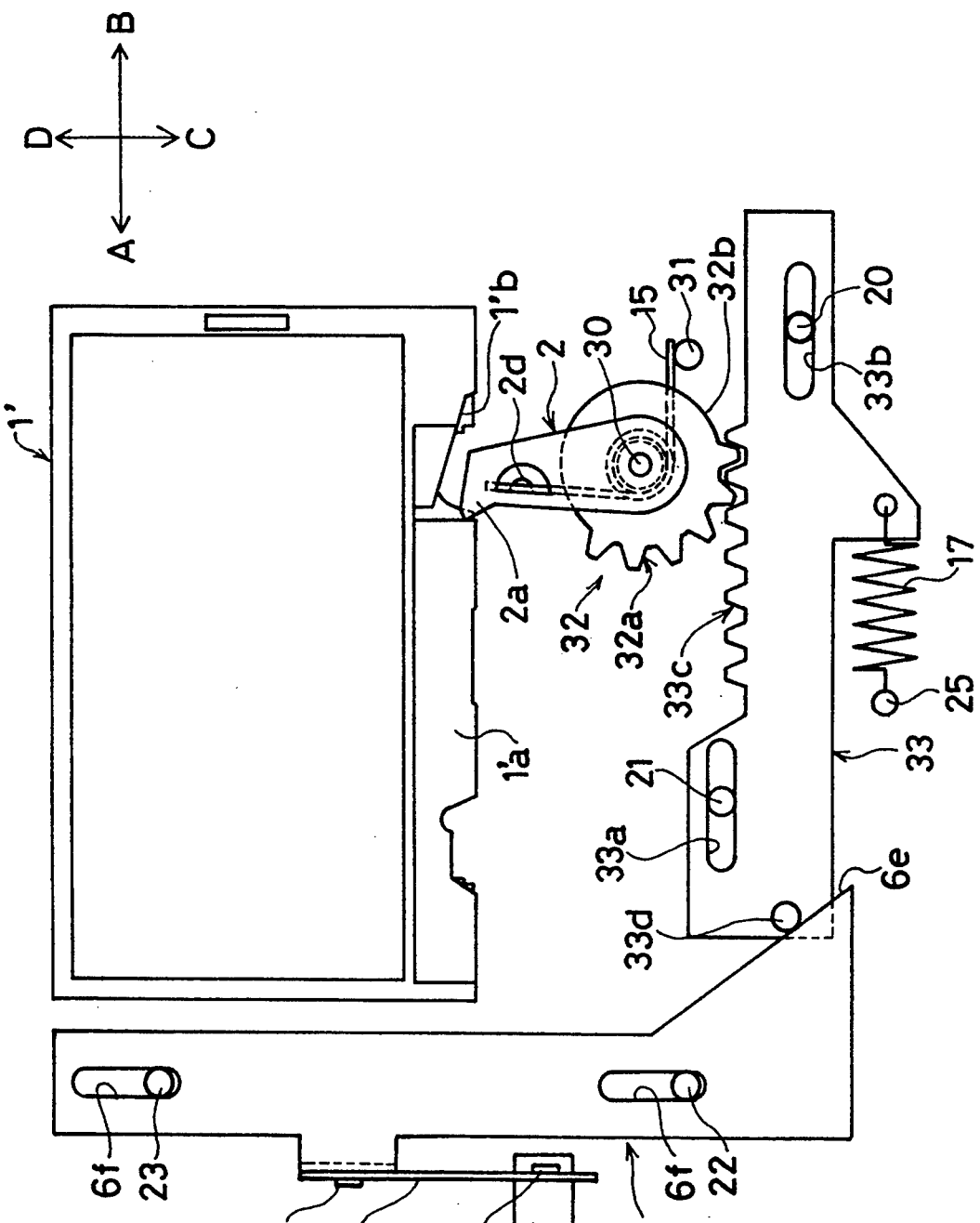
FIG. 14 is a plan view showing the essential sections of the recording and reproducing device when the device performs an operation.

Then, as illustrated in FIG. 14, the cassette holder is closed, i.e., it is moved to the record-reproduction position. At this time, the lever 9 turns about a shaft 27 and moves the door lever 6 along the guide pins 22 and 23 in the D direction.

The movement of the door lever 6 causes the guide shaft 33d to move over the transmission section 6e. At this time, the rack lever 33 is moved in the B direction, and the slider arm 2 is moved counterclockwise because the rack gear section 33c meshes with the tooth section 32a.

This causes the edge 2a to move the slider 1'a in the A direction to uncover the opening, not shown, for insertion of the head and the D-cassette 1' to be brought into the predetermined position for recording and reproduction.

This state is maintained by locking the cassette holder with a locking mechanism, not shown. Meanwhile, when discharging the D-cassette 1', the locking mechanism is unlocked. As a result, the cassette holder which is pushed in the opening direction is opened or moved into a position allowing the cassette to be taken out from the cassette holder.

At this time, the door lever 6 is moved in the C direction by the lever 9, and the rack lever 33 is therefore moved in the A direction by the force of the spring 17. As a result, the slider arm 2 is moved clockwise because the rack gear section 33c meshes with the tooth section 32a, the slider 1'a is moved in the B direction or closed, and because the D-cassette 1' is pushed out of the cassette holder by the slider arm 2.

In contrast, when the C-cassette 1" is stored in the cassette holder, as illustrated in FIG. 15, the slider arm 2 is moved clockwise against the force of the spring 15 while making the edge 2a slide over the base of the C-cassette 1" as the C-cassette 1" does not provided with a hole into which craw-like edge of the slider arm 2 fits. Then, the C-cassette 1" is placed in the predetermined position and secured by the cassette guides, not shown.

When the slider arm 2 is moved clockwise, the tooth section 32a and the rack gear section 33c are disconnected and the toothless section 32b is moved to face the rack gear section 33c.

And, when the cassette holder is closed to bring the C-cassette 1" into the record-reproduction position, the lever 9, the door lever 6, and the rack lever 33 are moved in the same manner as they are moved when the D-cassette 1' is loaded.

At this time, since the rack gear section 33c faces the toothless section 32b, the gear section 32 does not interfere with the rack gear section 33c, allowing the cassette holder and the C-cassette 1' to move into the record-reproduction position.

When discharging such a C-cassette 1", the locking mechanism is unlocked to open the cassette holder. Then, as illustrated in FIG. 15 the lever 9, the door lever 6, and the rack lever 33 are moved in the same manner as they are moved when discharging the D-cassette 1' so as to allow the C-cassette 1" to be manually taken out of the cassette holder.

When the C-cassette 1" is manually taken out of the cassette holder, the slider arm 2 is moved counterclockwise round the shaft 30 by the force of the spring 15 and the tooth section 32a meshes with the tooth section 33c. As a result, the slider arm 2 is locked at the predetermined stand-by position.

As described above, the recording and reproducing device of this embodiment has a cassette holder for storing either the C-cassette 1" or the D-cassette 1' and is capable of recording and reproducing information on/from the cassettes. This device is useful as it is compatible with both the D-cassette 1' providing improved sound quality and the widely used C-cassette 1".

In addition, unlike a conventional device, with the configuration of the device of this embodiment, since the slider 1'a is opened by the force of the spring 15 when the cassette holder is closed, there is no need to push the cassette against the force pushing the lever in the direction of closing the slider when storing the cassette in the cassette holder. Therefore, it is not necessary to push the cassette into the cassette holder by hand.

With this device, since the members constituting the slider moving mechanism has the sizes almost the same as those in the conventional device, this configuration does not cause the size of the mechanism to be larger than the conventional one but enables the cassette to be inserted into the cassette holder without requiring hand power.

It is also possible to detect two states, namely a state in which the D-cassette 1' is loaded and a state in which is the C-cassette 1" is loaded, by combining the configuration of the second embodiment and that of the third embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recording and reproducing device for recording and reproducing information on/from a recording medium like a magnetic tape held in an elongate cassette having an opening in a longitudinal side surface of the cassette at which said recording medium is exposed, comprising:

storing means for storing and moving between a discharge position and a record-reproduction position either a first cassette or a second cassette of a size which is substantially equal to a size of said first cassette, said first cassette having a slider for reciprocal sliding engagement along the longitudinal side surface for covering and uncovering said opening and a first pushing means for pushing said slider in a closing direction; and slider moving means for opening and closing said slider, said slider moving means including:

a first rotating body for moving said slider moving means in contact with said slider to uncover said opening when said first cassette is stored in said storing means;

second pushing means for pushing said first rotating body in a direction in which said cassette stored in said storing means is discharged;

a second rotating body including a first free end and a second free end, said first free end including a first rotating shaft about which the first rotating body rotates; and restricting means for restricting a rotation of said first rotating body when said first rotating body is rotated at a predetermined angle about said first rotating shaft so as to cause said first rotating body to be rotated around a second rotating shaft of said second rotating body, wherein, when said cassette is stored and moved toward the record-reproduction position, said first rotating body is rotated so that a radius of rotation about said first rotating shaft is greater than a radius of rotation about said second rotating shaft.

2. The recording and reproducing device according to claim 1, wherein said first rotating body includes a projection which comes into contact with and moves said slider to uncover said opening when said first cassette is stored in said storing means, said projection being mounted on a free end of said first rotating body.

3. The recording and reproducing device according to claim 1, wherein said second rotating shaft of said second rotating body is mounted between said first rotating shaft and a free end of said first rotating body.

4. The recording and reproducing device according to claim 1, wherein said storing means is a cassette holder.

5. The recording and reproducing device according to claim 1, wherein said first rotating body is a slider arm.

6. The recording and reproducing device according to claim 1, wherein said second rotating body is a lever.

7. The recording and reproducing device according to claim 2, wherein said projection is a pin.

8. The recording and reproducing device according to claim 1, wherein said restricting means includes a guide slot formed in said first rotating body and a guide shaft which is mounted on said second free end of said second rotating body and fits into said guide slot, said guide slot extending substantially in an arc around said first rotating shaft.

9. The recording and reproducing device according to claim 1, further comprising detecting means for detecting an angle of rotation of said first rotating body.

10. The recording and reproducing device according to claim 9, wherein said detecting means is a rotary switch which is located so that its rotation axis and said second rotating shaft are coaxial and which moves together with said first rotating body.

11. The recording and reproducing device according to claim 1, further comprising:

locking means which interacts with a rotation of said second rotating body when loading said first cassette in said storing means;

third pushing means for pushing said locking means in the direction in which said cassette is discharged; and holding means for holding said locking means in a lock position when said first cassette is stored in said storing means and said locking means is moved.

12. The recording and reproducing device according to claim 11, wherein a rotation of said second rotating body is not transmitted to said locking means when an angle of rotation of said second rotating body exceeds an angle of rotation when said first cassette is stored.

13. The recording and reproducing device according to claim 12, wherein said second rotating body has a control pin, and said locking means has a substantially J-shaped slot in which said control pin is inserted.

14. The recording and reproducing device according to claim 11, wherein said locking means has an indentation with which said holding means is locked, said holding means having a protruding member which is inserted into said locking means, and has fourth pushing means for pushing said holding means in a direction in which said protruding member is inserted into said indentation.

15. The recording and reproducing device according to claim 11, further comprising:

transmitting means which moves with a movement of said storing means; and unlocking means which interacts with said transmitting means and said holding means and unlocks said locking means.

16. The recording and reproducing device according to claim 15, further comprising a controlling member which moves from a stand-by position to the lock position with the movement of said transmitting means, wherein the movement of said controlling member is transmitted to said locking means when said locking means is in the stand-by position, and the movement of said controlling member is not transmitted to said locking means when said locking means is in the lock position.

17. The recording and reproducing device according to claim 16, wherein said locking means has a shaft, and said controlling member has a long guide hole in which said shaft of said locking means is inserted, said guide hole extending in a moving direction of said controlling member.

* * * * *